US012700111B2

(12) United States Patent
Sabato et al.

(10) Patent No.: US 12,700,111 B2
(45) Date of Patent: Aug. 4, 2026

(54) METHOD FOR DEPTH ESTIMATION FOR A VARIABLE FOCUS CAMERA

(71) Applicant: Wooptix S.L., Madrid (ES)

(72) Inventors: Ceruso Sabato, Madrid (ES); Ricardo Oliva Garcia, Madrid (ES); Jose Manuel Rodriguez Ramos, Madrid (ES)

(73) Assignee: WOOPTIX S.L., Madrid (ES)

( * ) Notice: Subject to any disclaimer, the term of this patent is extended or adjusted under 35 U.S.C. 154(b) by 579 days.

(21) Appl. No.: 17/663,643

(22) Filed: May 16, 2022

(65) Prior Publication Data

US 2022/0383525 A1      Dec. 1, 2022

(30) Foreign Application Priority Data

May 20, 2021     (EP) ..................................... 21382458

(51) Int. Cl.
　　 *G06T 7/50* 　　　　(2017.01)
　　 *G06T 7/73* 　　　　(2017.01)
　　 *G06V 10/82* 　　　 (2022.01)
(52) U.S. Cl.
　　 CPC .................. *G06T 7/50* (2017.01); *G06T 7/73* (2017.01); *G06V 10/82* (2022.01);
　　　　　　　　　　　(Continued)
(58) Field of Classification Search
　　 None
　　 See application file for complete search history.

(56) References Cited

U.S. PATENT DOCUMENTS

| 2014/0184748 | A1* | 7/2014 | Gharib ................. | H04N 13/246 |
| | | | | 348/46 |
| 2021/0073959 | A1* | 3/2021 | Elmalem ................ | G06N 3/084 |
| 2021/0194578 | A1* | 6/2021 | Tonkin ..................... | G06T 7/20 |

FOREIGN PATENT DOCUMENTS

| CN | 109803090 A | 5/2019 |
| CN | 110400341 A | 11/2019 |

OTHER PUBLICATIONS

Piao (Piao Y, Ji X, Zhang M, Zhang Y. Learning multi-modal information for robust light field depth estimation. arXiv preprint arXiv:2104.05971. Apr. 13, 2021.) (Year: 2021).*

(Continued)

*Primary Examiner* — Vincent Rudolph
*Assistant Examiner* — Meredith Taylor
(74) *Attorney, Agent, or Firm* — McCoy Russell LLP

(57) ABSTRACT

The disclosure relates to a method including: capturing a sequence of images of a scene with a camera at different focus positions according to a predetermined focus schedule that specifies a chronological sequence of focus positions of the camera, extracting image features of captured images, after having extracted and stored image features from said captured images, processing a captured image whose image features have not yet been extracted, said processing comprising extracting image features from the currently processed image and storing the extracted image features, said processing further comprising aligning image features stored from the previously captured images with the image features of the currently processed image, and generating a multi-dimensional tensor representing the image features of the processed images aligned to the image features of the currently processed image, and generating a two-dimen- (Continued)

sional depth map using the focus positions in the predetermined focus schedule and the generated multi-dimensional tensor.

16 Claims, 13 Drawing Sheets

(52) U.S. Cl.
CPC ............... *G06T 2207/10028* (2013.01); *G06T 2207/10148* (2013.01); *G06T 2207/20081* (2013.01); *G06T 2207/20084* (2013.01)

(56) References Cited

OTHER PUBLICATIONS

Hu J, Ozay M, Zhang Y, Okatani T. Revisiting single image depth estimation: Toward higher resolution maps with accurate object boundaries. In 2019 IEEE winter conference on applications of computer vision (WACV) Jan. 7, 2019 (pp. 1043-1051). IEEE. (Year: 2019).*

Eigen, D. et al., "Predicting Depth, Surface Normals and Semantic Labels with a Common Multi-Scale Convolutional Architecture," Proceedings of the 2015 IEEE International Conference on Computer Vision (ICCV), Dec. 7, 2015, Santiago, Chile, 9 pages.

Kim, H. et al., "Video Depth-From-Defocus," Proceedings of the 2016 Fourth International Conference on 3D Vision, Oct. 25, 2016, Stanford, California, 10 pages.

Vaswani, A. et al., "Attention Is All You Need," Proceedings of the 31st Conference on Neural Information Processing Systems (NIPS 2017), Dec. 4, 2017, Long Beach, California, 11 pages.

Maximov, M. et al., "Focus on defocus: bridging the synthetic to real domain gap for depth estimation," Proceedings of the 2020 IEEE/CVF Conference on Computer Vision and Pattern Recognition (CVPR), Jun. 13, 2020, Seattle, Washington, 21 pages.

"CNN Tensor Shape Explained—Convolutional Neural Networks and Feature Maps," WayBack Machine Internet Archive Website, Available Online at https://web.archive.org/web/20210123170139/https://deeplizard.com/learn/video/k6ZF1TSniYk, Available as Early as Jan. 23, 2021, 7 pages.

European Patent Office, Extended European Search Report Issued in Application No. 21382458.4, Nov. 17, 2021, Germany, 16 pages.

* cited by examiner

Fig. 2b

3D Residual Convolution Block 320, 350, 380, 410

3D Multiscale Feature Aggregation Block 340, 370, 400

3D Spatial Pyramid Pooling 330, 360, 390, 420

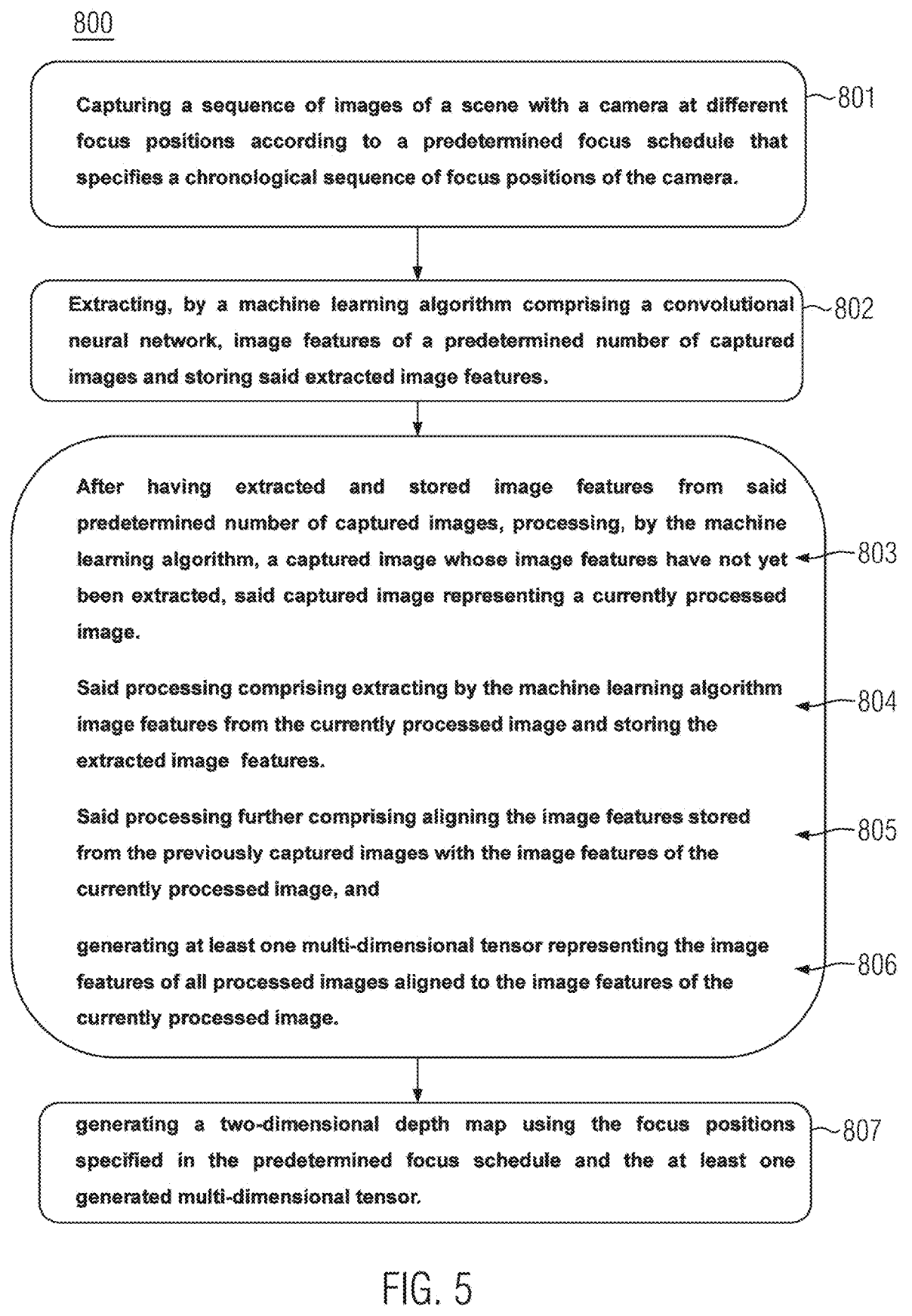

800

Capturing a sequence of images of a scene with a camera at different focus positions according to a predetermined focus schedule that specifies a chronological sequence of focus positions of the camera. ~801

Extracting, by a machine learning algorithm comprising a convolutional neural network, image features of a predetermined number of captured images and storing said extracted image features. ~802

After having extracted and stored image features from said predetermined number of captured images, processing, by the machine learning algorithm, a captured image whose image features have not yet been extracted, said captured image representing a currently processed image. ~803

Said processing comprising extracting by the machine learning algorithm image features from the currently processed image and storing the extracted image features. ~804

Said processing further comprising aligning the image features stored from the previously captured images with the image features of the currently processed image, and ~805 generating at least one multi-dimensional tensor representing the image features of all processed images aligned to the image features of the currently processed image. ~806 generating a two-dimensional depth map using the focus positions specified in the predetermined focus schedule and the at least one generated multi-dimensional tensor. ~807

FIG. 5

METHOD FOR DEPTH ESTIMATION FOR A VARIABLE FOCUS CAMERA

CROSS-REFERENCE TO RELATED APPLICATION

The present application claims priority to European Patent Application No. 21382458.4 filed on May 20, 2021. The entire contents of the above-listed application is hereby incorporated by reference for all purposes.

TECHNICAL FIELD

The disclosure relates to a method, a computer system and a storage media.

BACKGROUND

When capturing two-dimensional images from three-dimensional scenes, e.g. capturing an image from a scene in real physical three-dimensional space, depth information is lost when the three-dimensional scene is projected onto a two-dimensional image.

SUMMARY

It is an important and challenging task in computer vision or robotic vision, especially for autonomous robotic systems, to recover at least part of this lost spatial depth information in order to for example being able to recognize three-dimensional objects and/or to distinguish between background and foreground features or objects in the captured two-dimensional image.

Existing techniques either require the use of dedicated intricate specific hardware, e.g. a stereo camera and/or intricate optical microlens arrays, and/or require intricate and computer resource intensive processing of captured images, e.g. structure from motion techniques and/or depth from focus techniques.

In particular, current techniques such as structure from motion techniques and/or depth from focus techniques, yield poor results when attempting to extract or recover depth information from dynamic scenes, e.g. when attempting to extract depth information from a stream of images, wherein in the captured scene a motion of objects or features occurs while the stream of images of the scene is captured.

Problem

It is further an objective of the present disclosure to provide improved means for extracting/estimating/recovering depth information from two-dimensional images captured by a camera/image capturing device from a real three-dimensional scene. In particular, for example, it is an aim of the present disclosure to speed up the process of estimating depth information from a plurality of captured images from a scene and to improve the accuracy of the estimated depth information, in particular in the case of capturing images from a dynamic scene.

Solution

According to the present disclosure, said objectives are achieved by a computer-implemented method, a computer system and a computer-storage media.

For example, a computer-implementable method for extracting depth information from a plurality of images taken by a camera at different focus positions, may comprise one, some or all of the following steps.

capturing a sequence of images of a scene with a camera at different focus positions according to a predetermined focus schedule that specifies a chronological sequence of focus positions of the camera, extracting, by a machine learning algorithm comprising or being a convolutional neural network, image features of a predetermined number of captured images and storing said extracted image features, after having extracted and stored image features from said predetermined number of captured images, processing, by the machine learning algorithm, a captured image whose image features have not yet been extracted, said captured image representing a currently processed image, said processing further comprising aligning the image features stored from the previously captured images with the image features of the currently processed image, and generating at least one multi-dimensional tensor representing the image features of at least some of the processed images, or of all processed images, aligned to the image features of the currently processed image, and generating a two-dimensional depth map using the focus positions specified in the predetermined focus schedule and the at least one generated multi-dimensional tensor.

Herein, the expression of at least some of the processed images may refer to a subset of the predetermined number of captured images that have been processed, i.e. whose image features have been extracted and stored, or it may refer to a/the set comprising all of the processed predetermined number of captured images. Furthermore, the expression of all processed images may refer to a/the set comprising all of the processed predetermined number of captured images or may refer to a/the set comprising all of the processed predetermined number of captured images and the currently processed image.

For example, if k is a natural number denoting the predetermined number of captured images, which may include the currently processed image, then the expression of at least some of the processed images may refer to a natural number s, wherein s is less than or equal to k and wherein s is greater than or equal to 2. In some embodiments, s can be equal to k.

Herein, a scene can be understood as a scene in real physical three-dimensional space.

Herein, an image or image frame can be understood as a two-dimensional pixilated digital image or image frame having a width dimension and a height dimension.

Herein, a/the plurality of images or image frames may be images/image frames of a video-stream.

Herein image features can inter alia be understood as characteristics or properties of objects or subjects in a/the captured image, such as, for example, shapes, contours, colors of objects or subjects in a/the captured image. Image features may also refer to information describing whether an object or subject is in focus or is defocused, i.e. image features may comprise focus/defocus information.

The above-mentioned predetermined focus schedule may specify an order in which a/the camera captures images at specific focus positions at specific times. In other words the focus schedule can specify a predefined list of focus positions to be used by the camera and also can specify how this list is to be traversed when capturing a sequence of images of a scene with the camera.

Said predetermined focus schedule may comprise a plurality of focus positions that can comprise different focus positions and/or identical focus positions. Stated differently, a/the focus schedule may specify that the same focus position of a/the camera may be used at different points in time for capturing an image.

A/the camera may then traverse said exemplary focus schedule chronological to capture images at defined focus positions.

Herein, a/the camera can be understood as an image capturing system that can capture pixelated two-dimensional digital images. In addition, it is to be understood that said exemplary camera can capture a stream of images, e.g. a video-stream of images. In particular, a camera herein may be understood as being an optical camera.

An exemplary camera may be a common digital camera, e.g. a camera of a smartphone. Furthermore, a/the camera can be configured for capturing images at different focus positions, i.e. for traversing a/the predetermined focus schedule.

For example, a/the camera may comprise an optical element, e.g. one or more lenses, for controlling where on an image detection plane, e.g. image sensor plane, captured light converges, i.e. the camera can be a variable focus camera.

The above identified exemplary method steps may be carried out iteratively or in a loop until all captured images or until a desired number captured images have been processed.

The above and herein exemplary described method for extracting depth information from a plurality of images taken by a camera at different focus positions enables a faster and more accurate extraction of depth information from images taken with varying focus than current state-of-the art depth-from-focus algorithms.

The speed-up of the depth information extraction from images focused at different positions according to the herein described method steps allows the extraction of depth information from a stream of images in real time, i.e. without a delay noticeable for a user of the camera.

For example, during capturing of a video-stream by a/the camera, depth information can be extracted at the same time from images of the captured video-stream. For example, depth information can be extracted at speeds of less than 18 ms per image, thereby allowing for example application of the herein described method on video-streams with an image frame rate of at least 30 frames per second or higher.

Furthermore, it is, for example, possible that before a user of a/the camera commits to take a picture of a scene, the camera may automatically capture a plurality of images of said scene with varying focus according to a/the predetermined focus schedule to extract depth information for the scene in order to optimize the focus settings for the image the user wants to capture and/or to generate an all-in-focus image of the scene the user wants to capture.

The improved performance of the herein described method for extracting depth information from a plurality of images is inter alia due to the fact that while processing a current image or current input image, the information of at least some or all of the previously captured images/past images is saved, re-used and taken into account, thereby avoiding the need for extra computations.

In addition, as the herein described method for extracting depth information from a plurality of images does not require any intricate mathematical operations, but, for example, rather relies on basic mathematical operations or computations like addition and multiplication that can be carried out in parallel, it is ideally suited to be carried out by a graphical processor unit (GPU) that can carry out such parallel basic computations faster than a generic central processor unit (CPU).

Furthermore, the herein exemplary described method for extracting depth information from a plurality of images provides a more robust and more accurate absolute depth information extraction from images of a scene, in particular in the case of a dynamic scene, i.e. a scene wherein movements of objects and/or subjects occurs during the capturing of a plurality of images.

The improved robustness and accuracy of the herein exemplary described method is inter alia due to the fact that the processing of captured images is performed only on the feature level not on the level of images or image frames as a whole.

The herein described method dispenses with the need of directly registering the images/image frames with respect to each other, as is required by common depth-of-focus techniques and which in particular causes problems when objects or subjects in the scene move between captured images and wherein said movement(s) can cause current techniques for image alignment to fail.

In contrast to current techniques, the herein described method allows carrying out alignments on the feature level, i.e. aligning past/previously captured features from past/previously captured images with image features from a currently processed image/currently processed input image, thereby providing an indirect implicit registration/alignment between captured images. The present method is therefore able to better cope with movements in the scene and/or due to camera movements, e.g. due to shaking support of the camera, that may occur between captured images.

Aside from using the extracted depth information, i.e. the generated two-dimensional depth map, to generate better focused images, the herein described method steps and means may also be applied in the field of computer and robotic vision.

For example, the herein described method can be used to improve visual object recognition of robots or cars, e.g. autonomous robots or cars, in particular for improving autonomous navigation capabilities.

The herein described method can be used to improve classification of images, e.g. improve the accuracy and performance of image or object detection algorithms, and/or to improve image/video analytic systems using the extracted depth information.

Furthermore, the extracted depth information, i.e. the generated two-dimensional depth map, can be used as input for displays, in particular, for example, as input for three-dimensional displays to generate three-dimensional images of a/the scene captured in a/the plurality of two-dimensional images.

Furthermore, the herein described method and the herein described machine learning algorithm comprising a convolutional neural network is independent from any type of camera used, i.e. it works with images and cameras of any type. No specific camera hardware or lenses are required.

The convolutional neural network can be trained with different cameras and focus configurations, thereby allowing a better generalization of the method to unknown scenes/unknown samples.

In the above and herein exemplary described method steps, the image features can be extracted by layers of the convolutional neural network as three-dimensional feature tensors comprising a width dimension, W, a height dimension, H, and a channel dimension, C, wherein said channel dimension can describe the number of feature maps extracted from an image by one or more layers of the convolutional neural network and wherein the storing of extracted image features can comprise storing the extracted image features as a list of three-dimensional feature tensors.

An exemplary feature tensor, e.g. a feature tensor F of a currently processed image, may therefore be an element of $\mathbb{R}^{C,H,W}$, i.e. $F \in \mathbb{R}^{C,H,W}$, with C, W and H referring to the above-mentioned dimensions.

Herein, a feature map extracted from an image can be understood as a two-dimensional representation with a width dimension, W and a height dimension, H, of a feature or aspect or property or characteristic of an image detected/extracted by one or more layers of the convolutional neural network. In particular, a feature map can be understood as a two-dimensional representation of the locations where a specific feature or aspect or property or characteristic of an image is detected or extracted by one or more layers of the convolutional neural network.

The width and height dimensions of said feature map may be equal to or different from, e.g. smaller than, the width and height dimensions of the image from which the feature map was extracted.

Said exemplary feature maps can be understood as being/representing slices of said exemplary three-dimensional feature tensor(s).

Herein, the term feature of an image or image feature may therefore be understood as representation of an image or as representation of an aspect of an image in a different dimensional space, e.g. a higher-dimensional space, than the dimension space of the image from which the feature was extracted.

The herein described process of extracting, by a machine learning algorithm comprising a convolutional neural network, image features from an image, can therefore be understood as transforming an image into image features.

Representing extracted image features as tensors facilitates the computational processing of the extracted image features as the feature tensors can be more easily processed by the convolutional neural network.

Extraction of image features by the convolutional neural network can be carried out by a sequence comprising convolutional layers, batch normalization(s) (BN), rectified linear activation functions (ReLu), resampling, e.g. up-sampling (Up), reshaping or pooling, concatenation (Concat) and skip operations.

Herein, a/the batch normalization (BN) may refer to a normalization operation using an estimated mean, $E(x)$, a.k.a. running mean, and variance, Var $(x)$, and a scale parameter and a shift parameter, wherein said scale parameter and said shift parameter may have been learned by the convolutional neural network during training.

Hence, a batch normalization (BN) can be expressed, for example, as:

$$BN(x) = \frac{x - E(x)}{\sqrt{\text{Var}(x)}} * \text{scale} + \text{shift}. \tag{a}$$

Herein, a/the rectified linear activation function(s) (ReLu) can be understood as referring to an activation function of the convolutional neural network that sets negative values to zero and leaves positive values, including zero, unchanged.

Hence, a rectified linear activation function (ReLu) can be expressed, for example, as:

$$ReLu(x) = \max(x, 0). \tag{b}$$

6

Herein, an up-sampling (Up, UP, Up-sample) operation may refer to an operation that increases the width and/or height dimension(s) of an image or image feature or image feature tensor or feature map, wherein the increase operation is based on/comprises interpolating or extrapolating values of the original image or original image feature tensor or original feature map to obtain up-sampled values.

Herein, a/the reshaping operation may refer to an operation that modifies the shape, i.e. the dimensions, of a tensor, e.g. the shape of an image or image feature or feature map or image feature tensor, while maintaining the total number of elements of the tensor. For example, a tensor of shape [10, 3, 9, 2] could be reshaped into [10, 3, 18], [30, 18], [30, 1, 18] or [540] as all these shapes contain the same total number of elements (540).

Herein, a/the pooling operation (Pool, Pooling, Spatial Pyramid Pooling) may be understood as an operation similar to an up-sampling operation but to down-sample the width and/or height dimension(s) of an image or image feature or image feature tensor or feature map. For example, a/the pooling operation may apply an operation, e.g. a maximum or average function, to a subset of pixels, e.g. pixels of an image or image feature or feature map or image feature tensor, wherein the subset corresponds to the size of a predetermined kernel/filter, with a predetermined stride to generate a/one pixel.

For example, a max pooling operation with kernel size=2 and stride=2 will down-sample an input, e.g. image or image feature or image feature tensor or feature map, to its half using subsets of pixels of shape [2, 2], wherein the down-sample factor corresponds to the specified stride.

The chosen kernel and stride sizes are exemplary only. Other kernel and stride sizes, for example determined empirically, may be chosen as well.

Herein, a/the concatenation operation may refer to an operation that merges two or more tensors, e.g. images or image features or image feature tensors or feature maps, along a specific dimension. This operation may require that all the to be merged/to be concatenated tensors have the same shape in all dimensions, except in the concatenation dimension.

For example, a tensor t1 of shape [10, 3, 9] and a tensor t2 of shape [4, 3, 9] concatenated along the first dimension results in a tensor of shape [14, 3, 9].

Herein, a/the skip operation may refer to an operation that connects non-consecutive layers or non-consecutive sequences of operations of the convolutional neural network using a specific operation, e.g. an addition operation.

For example, let x1 be an output of an operation of layer 1 with x0 as an input, e.g. x1=layer1(x0), let x2 be an output of an operation of layer 2 with x1 as in input, e.g. x2=layer2 (x1), wherein layer 2 is consecutive to layer 1, and let x3 be an output of an operation of layer 3 with x2 as in input, e.g. x3=layer3(x2), wherein layer 3 is consecutive to layer 2.

Then an exemplary skip operation may be defined as addition of x3+×1, i.e. skipping the layer 2.

Herein, a/the convolutional layer or convolution layer may refer to convolution operations on images or image features or image feature tensors or feature maps.

Said possible exemplary operations or layers of the convolutional neural network may be carried out along/over/in multiple dimensions. The dimensionality of the operations may depend on where the operations are taking place within the convolutional neural network.

For example, the extraction of image features by the convolutional neural network may involve operations or layers that in particular operate/act on the height, H, and width, W, dimensions of image or image feature or image feature tensor or feature map and the further processing of extracted image features, e.g. the aligning of image features, may involve operations or layers of the convolutional neural network that act on further dimensions, such as a focus position dimension.

An exemplary specific configuration of an exemplary convolutional neural network architecture configured for the extraction of image features will be provided further below.

The above-mentioned aligning of the image features stored from the previously captured images with the image features of the currently processed image can comprise applying a four-dimensional encoding to both the image features stored from the previously captured images and to the image features from the currently processed image, wherein the image features are represented as tensors.

For example, said four-dimensional encoding can comprise embedding temporal, spatial and focus position information into the image features from the previously captured images and into the image features from the currently processed image.

For example, a four-dimensional encoding E may be composed according to the following two equations:

$$E_{2i,x,y} = \sin\left(e^{2i(-log(\alpha/c))}\sqrt{x^2 + y^2 + t^2 + d^2}\right) \tag{1}$$

$$E_{2i+1,x,y} = \cos\left(e^{2i(-log(\alpha/c))}\sqrt{x^2 + y^2 + t^2 + d^2}\right) \tag{2}$$

with $\alpha$ being a correction constant, for instance, a being greater than C, the number of channels or channel dimension size, x, y are spatial pixel coordinates, t is the time, i.e. the temporal position/the point in time/time stamp/time index of the captured image from which the image features were extracted, with $t \in [0, K-1]$, wherein K denotes a/the number of previously captured images, e.g. a/the predetermined number of captured images, $d \in [0, N-1]$ is the focus plane position/focus position/focus position index of a given image to be encoded and N is the total number of images, e.g. the number of images in the focus schedule or the sum of the number of images in the focus schedule and the number of images derived from the images of the focus schedule, wherein said derived images may be derived by interpolation or extrapolation of images captured according to the focus schedule, and $i \in [0, C/2]$ is an index used for dividing the number of channels into even and odd channels for the encoding(s).

Said exemplary encoding E being composed of exemplary encodings $E_{2i,x,y}$, $E_{2i+1,x,y}$, is/are applied via addition to the image features/feature tensors of the currently processed image $F \in \mathbb{R}^{C,H,W}$ and to each of the image features/feature tensors from the previously captured images, i.e. to each of the image features/feature tensors from the past K images $PF \in \mathbb{R}^{K,C,H,W}$ to obtain $EF \in \mathbb{R}^{C,H,W}$ and $EPF \in \mathbb{R}^{K,C,H,W}$ as follows:

$$EF_{c,x,y} = F_{c,x,y} + E_{c,x,y} \tag{3}$$

$$EPF_{k,c,x,y} = PF_{k,c,x,y} + E^k_{c,x,y} \tag{4}$$

, wherein $c \in [1, C]$ is a channel index and $E^k_{c,x,y}$ denotes the encodings of the image features/feature tensors of the past K images/previously captured images, i.e. $k \in [1, K]$ denotes an index for the image features/feature tensors of the past K/previously captured/stored images.

The above described example describes an exemplary four-dimensional encoding that is non-linear and based on using trigonometric functions and wherein the four-dimensional encoding is applied via addition to the image features from the currently processed image and to each of the image features stored from the previously captured images. However, other four-dimensional encodings may be used as well.

To align the encoded feature tensors EF and EPF and to generate at least one multi-dimensional tensor representing the image features of all previous processed images, e.g. of K processed images, aligned to the image features of the currently processed image, the following exemplary steps can be carried out.

A similarity operation for the encoded feature tensors can be carried out by the convolutional neural network based on the following exemplary similarity score(s):

$$Sim_{k,i,i'} = -\sqrt{\sum_j \left(EF'_{i,j} - EPF'_{k,i',j}\right)^2} \tag{5}$$

, wherein EF' is a two-dimensional matrix that has been obtained by reshaping EF with the convolutional neural network, and wherein i, j denote the matrix elements, and wherein EPF' is a three-dimensional tensor that has been obtained by reshaping EPF with the convolutional neural network and wherein k, i', j denote the elements of the three-dimensional tensor with k being the index denoting image features tensors of the past K/previously captured/stored images. Herein indices i and i', for example, have a range of [0, (H*W)−1] and index j may have a range of [0, C−1], with H, W being the height and width dimension of the feature tensors and with C being the number of channels.

For completeness and as previously indicated, it is noted that is possible that EPF also may contain the features extracted of the currently processed image, i.e. may contain the feature tensor of the currently processed image. However, since the feature tensor of the currently processed image must be completely similar to itself, the similarity score would not be affected when including the feature tensor of the currently processed image in EPF.

However, including the feature tensor of the currently processed image in EPF may be inter alia useful to check the validity and robustness of the convolutional neural network, in particular, for example, during training of the convolutional neural network.

Hence, $Sim \in \mathbb{R}^{K,HW,HW}$ can be understood as similarity scores between image features of a currently processed image and the image features for each of the K past images.

Said similarity score can be translated to probabilities $Sim' \in \mathbb{R}^{K,HW,HW}$ according to $$Sim'_{k,i,j} = \frac{e^{Sim_{k,i,j}}}{\sum_{j'} e^{sim_{k,i,j'}}} \tag{6}$$

with $Sim' \in \mathbb{R}^{K,HW,HW}$ being normalized similarity scores with the property:

$$\sum_j Sim'_{k,i,j} = 1 \ \forall \ k, i \tag{7}$$

Said exemplary normalized similarity scores can then be multiplied with a reshaped encoded feature tensor of the past K images $EPF^{v'} \in \mathbb{R}^{K,HW,C}$ to obtain $AF' \in \mathbb{R}^{K,HW,C}$:

$$AF'_{k,i,i'} = \sum_j \mathrm{Sim}'_{k,i,j} EPF^{v'}_{k,j,i'} \qquad (8)$$

AF' can then be reshaped to $AF \in \mathbb{R}^{K,C,H,W}$. Then, AF can be grouped along the first dimension to group the features corresponding to the same focus position, thus obtaining $GAF \in \mathbb{R}^{N,M,C,H,W}$, with $$M = \frac{K}{N},$$

wherein K is the total number of past K/previously captured/ stored images, which may include also the currently processed image, or the number of all focus positions of the past K/previously captured/stored images, which may also include the focus position of the currently processed image, and N is the number of unique focus positions among the total number K of focus positions.

Then, the information can be merged, e.g. by a reduction sum operation:

$$EPF^a_{n,c,h,w} = \sum_m GAF_{n,m,c,h,w}$$

with $EPF^\alpha \in \mathbb{R}^{N,C,H,W}$ being an example for the at least one multi-dimensional tensor representing the image features of all processed images aligned to the image features of the currently processed image, wherein n is an index in the range [0, N−1] and m is an index in the range [0, M−1], with N being the number of unique focus positions and with M as defined above.

As previously indicated, it is also possible that instead of aligning all stored or all processed image features from previous captured images with the image features of the currently processed image, it is conceivable to only align image features of some of predetermined number of captured/past K images that have been processed with the image features of the currently processed image. In other words, it is possible that $EPF^\alpha \in \mathbb{R}^{N,C,H,W}$ may, for example, represent only some of the previously processed image features, aligned to the image features of the currently processed image, i.e. the above-identified index ranges are exemplary only.

The step of generating a two-dimensional depth map using the focus positions specified in the predetermined focus schedule and the at least one generated multi-dimensional tensor may further comprise, generating, by the machine learning algorithm, at least one multi-dimensional focus probability map $fpm \in \mathbb{R}^{N,H,W}$ using the obtained at least one multi-dimensional tensor $EPF^\alpha$ and remapping said at least one multi-dimensional focus probability map to real physical distances using the focus positions specified in the predetermined focus schedule.

Said multi-dimensional focus probability map fpm can inter alia for example be obtained by the convolutional neural network via the following steps:

optional up-sampling of $EPF^\alpha$ to the original spatial resolution of a/the processed captured image(s), if required convolution to reduce the number of channels to 1 and normalization with a softmax operation to obtain the multi-dimensional focus probability map.

Herein, a softmax operation by the convolutional neural network may, for example, be defined as $$\mathrm{smax}(x)_i = \frac{e^{x_i}}{\sum_k e^{x_k}} \qquad (9)$$

with $$x \in \mathbb{R}^K$$

and having the properties $\sum_i \mathrm{smax}(x)_i = 1$ and $\mathrm{smax}(x)_i \in [0, 1]$.

Said obtained exemplary at least one multi-dimensional focus probability map $fpm \in \mathbb{R}^{N,H,W}$ is a three-dimensional tensor having a width dimension, W, a height dimension, H, and a focus position dimension, N, said focus position dimension describing the number of focus positions, e.g. different focus positions in the focus schedule or different focus positions from focus schedule and from synthetic/ derived focus positions for synthetic/derived images, said synthetic/derived images having been derived from captured images via interpolation or extrapolation.

Herein, the size of the width and height dimensions can be equal to the size of the width and height dimensions of an input image, wherein said input image is either an image of the predetermined number of captured images or the currently processed image or a synthetic image.

The remapping of the at least one multi-dimensional focus probability map fpm to real physical distances using the focus positions specified in the predetermined focus schedule may comprise computing the dot product between each pixel of the at least one multi-dimensional focus probability map and the known focus positions in the focus schedule, thereby obtaining a/the two-dimensional depth map with absolute depth information on the captured scene.

The above exemplary described steps may be carried out for different image feature scales, i.e. the step of extracting image features of the predetermined number of captured images and extracting image features of the currently processed image may further comprise extracting, by the machine learning algorithm, image features at different scales, wherein said scales are defined as a fraction of the height of an input image and/or as fraction of the width of an input image, wherein said input image is either an image of the predetermined number of captured images or the currently processed image.

Furthermore, the image features/feature tensors extracted from the predetermined number of captured images and the image features/feature tensors extracted from the currently processed image are stored in a computer-readable memory in a circular buffer, e.g. a circular buffer that can hold at least the image features from the predetermined number of captured images.

This allows an efficient memory management and efficient processing of streams of images, e.g. from a video-stream, while avoiding an overflow of memory.

Herein the predetermined number of captured images can be at least equal to or greater than the number of different focus positions specified by the focus schedule.

The above and herein exemplary described convolutional neural network can be a trained convolutional neural network that has been trained on a training sample comprising a plurality of images focused at different focus positions for a plurality of different scenes from the real physical world, wherein the scenes are static or dynamic, and wherein the convolutional neural network parameters have been optimized by comparing estimated depth maps generated by the convolutional neural network with corresponding known ground truth depth maps, i.e. depth maps whose absolute values are known, using a loss function.

Therein the loss function is a measure of how different the estimated/predicted depth maps are with respect to the expected known ground truth depth maps. The training of the convolutional neural network is run until the loss function has reached a desired/specified minimum and the optimal model parameters of the convolutional neural network have been determined. The minimization of the loss function may be achieved by optimization techniques such as using a gradient descent algorithm. However, also other optimization techniques, e.g. simulated annealing, genetic algorithms or Markov-chain-Monte-Carlo algorithms, may be applied to minimize the loss function and to determine the best model parameters of the convolutional neural network from the training, such as for example, best weights of convolutional layers, best scale or shift parameter values.

The above and herein exemplary described method and method steps may be implemented on a computer system comprising: a computer memory, one or more processors, e.g. a central processing unit (CPU) and/or a graphics processing unit (GPU), wherein the computer memory can store instructions that direct the one or more processors to carry out a method or method steps as described herein for extracting depth information from a plurality of images taken by a camera at different focus positions.

Since the herein described method steps enable a faster processing of images as compared to known depth-from-focus techniques, real-time processing of images and image streams can be achieved even on processors of portable devices such as smartphones.

Hence, said computing system can be a portable mobile device, e.g. a smartphone, comprising a camera that is configured for capturing images of a scene with different focus positions.

Furthermore, computer-executable instructions that when executed by a computer system can perform a method for extracting depth information from a plurality of images taken by a camera at different focus positions as described herein, can be stored on a computer-readable storage medium, e.g. a non-volatile computer storage medium.

The above-mentioned predetermined number of captured images may for example be smaller, equal to or greater than the number of focus positions in the predetermined focus schedule and/or may be equal to or greater than the number of different, i.e. unique, focus positions in the predetermined focus schedule. In particular, the predetermined number of captured images may be a natural number multiple of the number of focus positions in the predetermined focus schedule.

BRIEF DESCRIPTION OF THE FIGURES

The following figures illustrate exemplary:

FIG. 2b: Exemplary two-dimensional convolution block FIG. 5: Exemplary flow diagram of method for extracting depth information

DETAILED DESCRIPTION

Figure 1:
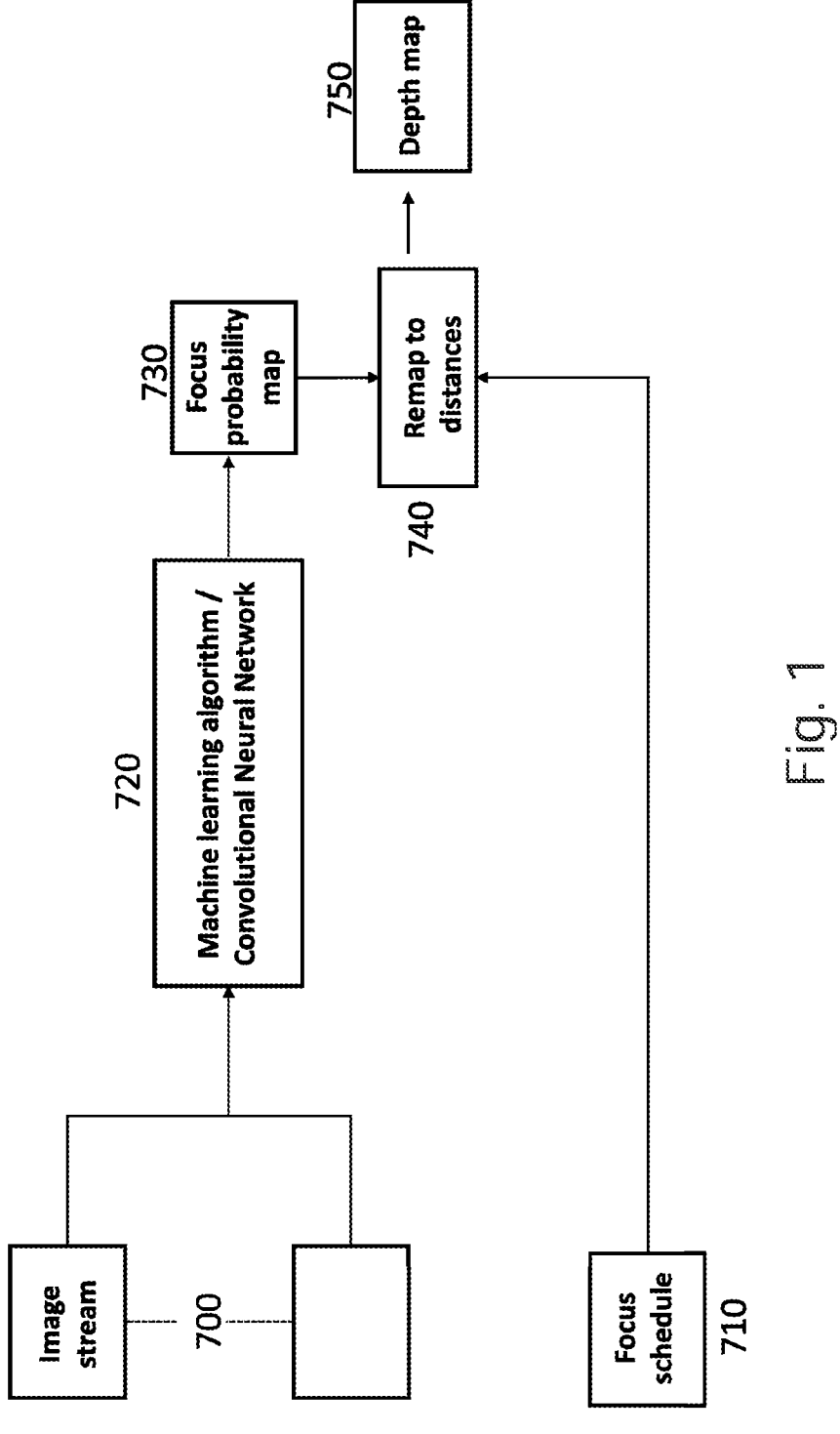
FIG. 1: Exemplary schematic overview of the method and means for extracting depth information

FIG. 1 exemplary shows a general overview of the method and means for extracting depth information from images.

A stream of images 700 of a scene, wherein said image stream has been taken by a camera with variable focus by capturing images at different focus positions according to a focus schedule 710 is inputted/fed to a machine learning model/machine learning algorithm 720 comprising a convolutional neural network.

The machine learning algorithm comprising a convolutional neural network outputs a focus probability map 730 of the scene can be remapped 740 to absolute distances using the known focus positions of the focus schedule 710 to obtain a two-dimensional depth map 750 of the scene.

Figure 2A:
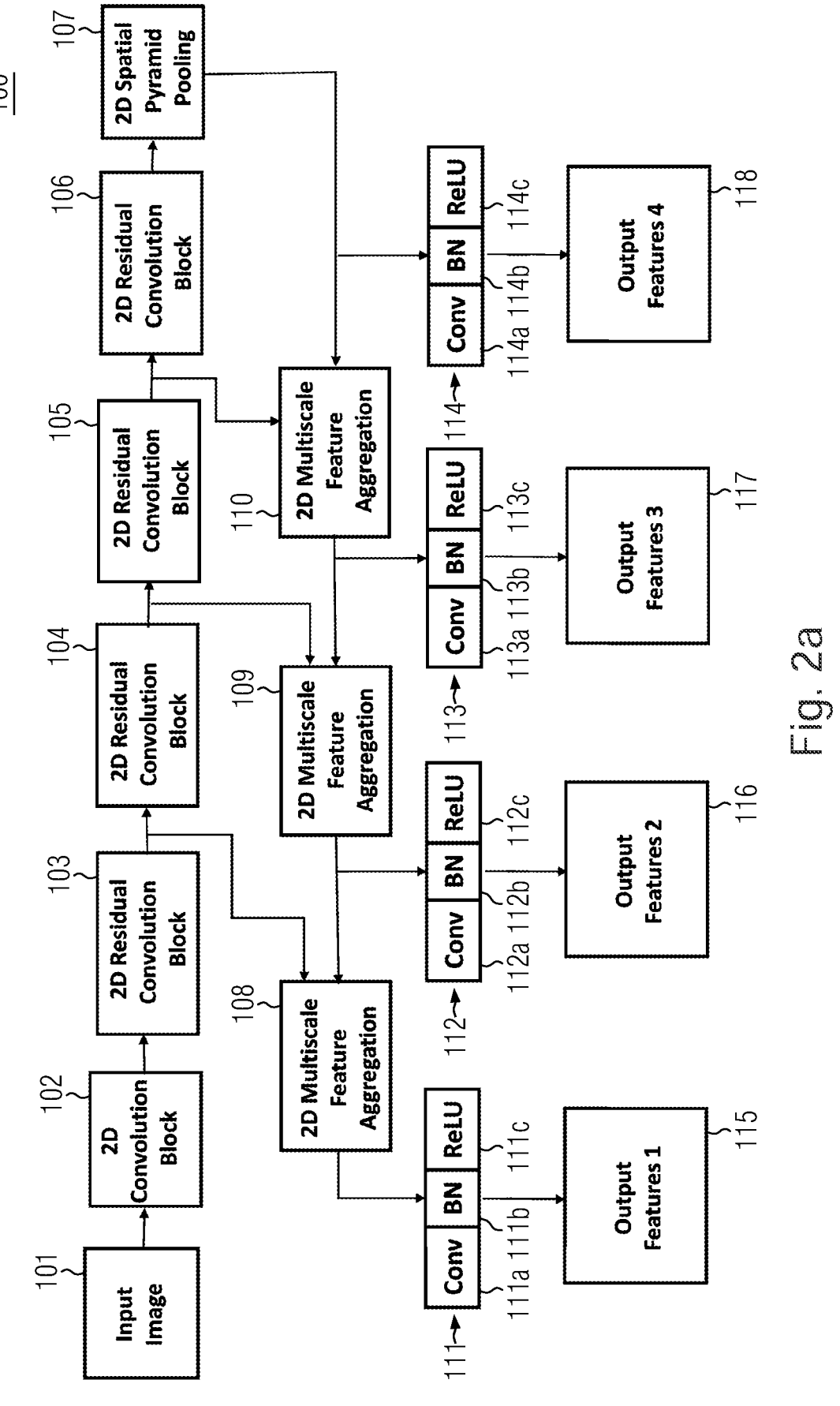
FIG. 2a: Exemplary two-dimensional encoder of convolutional neural network

FIG. 2a shows an exemplary part of an exemplary possible convolutional neural network architecture that could be used for extracting image features from images 101 that have been captured by a camera at different focus positions and that outputs the exemplary extracted features or feature tensors 115, 116, 117 and 118.

The in FIG. 2a shown exemplary part of an exemplary possible convolutional neural network architecture can be understood as representing a two-dimensional (2D) encoder 100 that encodes features from an input image 101 into two-dimensional feature maps of width W and height H for every channel dimension C.

Stated differently image features are extracted as three-dimensional feature tensors 115, 116, 117, 118 comprising a width dimension, W, a height dimension, H, and a channel dimension, C, wherein said channel dimension describes the number of feature maps extracted from an image by the one or more layers or blocks 102, 103, 104, 106, 107, 108, 109, 110, 111, 112, 113, 114 of the shown part of the convolutional neural network.

In the shown exemplary case, features from an input image 101 are extracted at four different scales, e.g. with different spatial sizes and/or different channel dimensions.

For example, the three-dimensional output feature tensor/extracted feature tensor 115 may be of shape (channel dimension C=16, H/8, W/8), the feature tensor 116 may be of shape (C=16, H/16, W/16), the feature tensor 117 may be of shape (C=16, H/32, W/32) and feature tensor 118 may be of shape (C=32, H/64, W/64), wherein H and W are the height and width dimension size of the input image 101.

It is noted that the number and choice of different scales is just exemplary and it is also possible to only use a single scale. Also the number of channels is just exemplary and, for example, may be determined/defined empirically.

In the following, two-dimensional (2D) operations or layers or blocks, e.g. a 2D convolution block or a 2D residual convolution block or a 2D spatial pyramid pooling block or a 2D multiscale feature aggregation block, can be understood as acting/operating on the height and width dimensions of a feature tensor, e.g. the height and width dimensions of a feature map. Said height and width dimensions may be equal in size or different in size from the size of the height and width dimensions of the input image 101.

The exemplary extraction of the features at four different scales is achieved by a sequence comprising a two-dimensional convolution block 102 and four two-dimensional residual convolution blocks 103, 104, 105 and 106. Said exemplary two-dimensional residual convolution blocks 103, 104, 105 and 106 each comprise a sequence of two-dimensional convolutional layers (Conv), batch normalization (BN), rectified linear activation functions (ReLu), summation (Sum) and skip connections between the input and output of a given residual convolution block. An exemplary configuration for a two-dimensional residual convolution block is provided in FIG. 2c.

Said two-dimensional convolution block 102 may, for example, comprise sequences of two-dimensional convolutional layers (Conv), batch normalization (BN), rectified linear activation functions (ReLu) and a pooling layer (pool). An exemplary configuration for a two-dimensional convolution block is provided in FIG. 2b.

After the last residual convolution block 106 is applied, a two-dimensional spatial pyramid pooling block 107 is applied. An exemplary configuration for such a two-dimensional spatial pyramid pooling block is provided in FIG. 2e.

The output of the two-dimensional spatial pyramid pooling block 107 is then merged sequentially with the intermediate outputs from the first three two-dimensional residual convolution blocks 103, 104 and 105 using the two-dimensional multiscale feature aggregation blocks 108, 109 and 110.

Figure 2B:
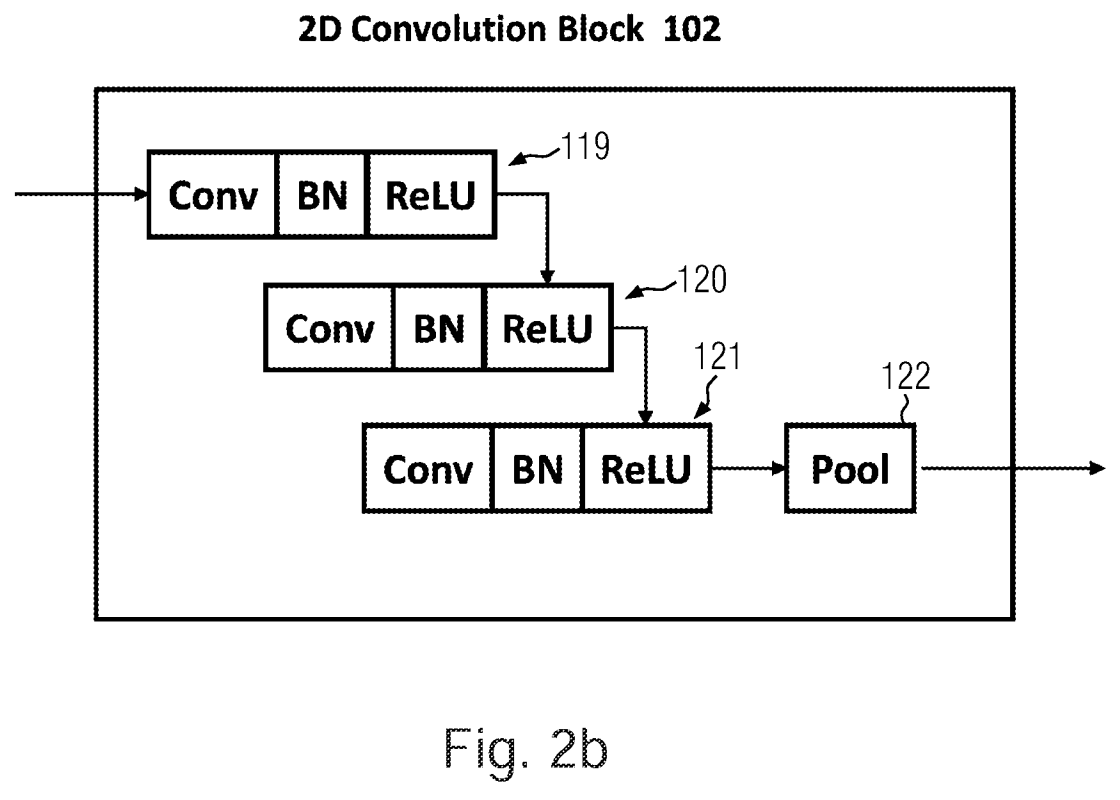
Figures 2C, 2D:
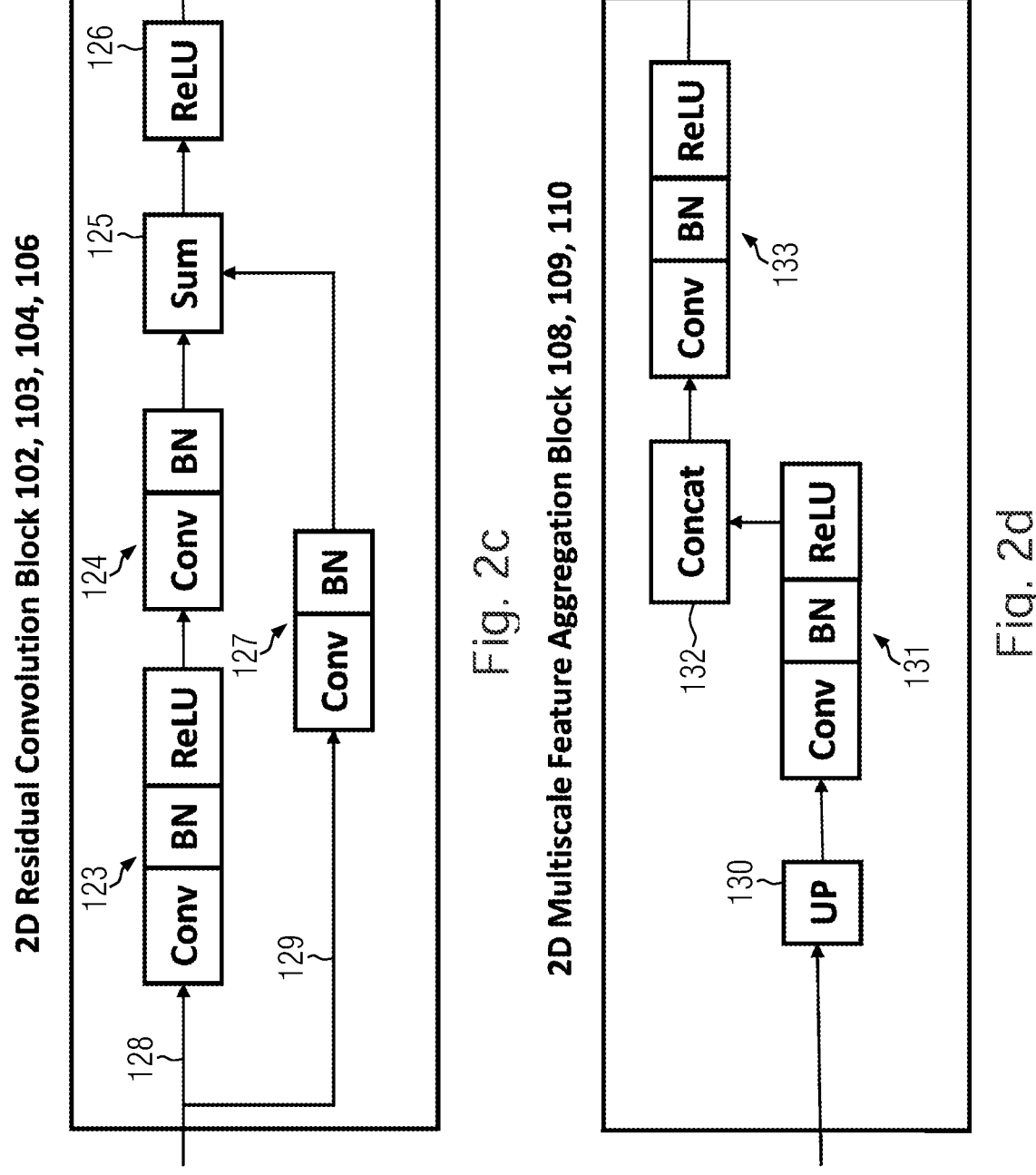
FIG. 2c: Exemplary two-dimensional residual convolution block
FIG. 2d: Exemplary two-dimensional multiscale feature aggregation block

An exemplary configuration for a two-dimensional multiscale feature aggregation block is provided in FIG. 2d.

As a last step, for each scale, a sequence 111, 112, 113, 114 of two-dimensional convolutional layers (Conv) 111a, 112a, 113a, 114a, batch normalization (BN) 111b, 112b, 113b, 114b and rectified linear activation functions (ReLu) 111c, 112c, 113c, 114c can be applied to obtain the extracted features/feature tensors 115, 116, 117, 118 for the exemplary four feature scales.

FIG. 2b exemplary shows a possible exemplary configuration for the two-dimensional convolution block 102 of FIG. 2a, comprising three sequences 119, 120, 121, wherein each sequence comprises a two-dimensional convolutional layer (Conv), a batch normalization (BN) and a rectified linear activation function (ReLu) operation. After the last sequence 121 a pooling layer (Pool) is applied to obtain the output of the convolution block 102.

FIG. 2c exemplary shows a possible exemplary configuration for a two-dimensional residual convolution block 103, 104, 105, 106 of FIG. 2a comprising two branches 128, 129.

Exemplary branch 128 comprises a first sequence 123 comprising a two-dimensional convolutional layer (Conv), a batch normalization (BN) and a rectified linear activation function (ReLu) operation and a second sequence 124 comprising a batch normalization (BN) and a rectified linear activation function (ReLu) operation.

Exemplary branch 129 only comprises a single sequence of a two-dimensional convolutional layer (Conv) and a batch normalization (BN) operation.

The output of said exemplary two branches is merged using a summation (Sum) operation 125 and the output of the two-dimensional residual convolution block is obtained after a final rectified linear activation function (ReLu) operation 126.

FIG. 2d exemplary shows a possible exemplary configuration for a two-dimensional multiscale feature aggregation block 108, 109, 110 of FIG. 2a.

Said exemplary two-dimensional multiscale feature aggregation block can comprise an up-sampling operation (UP) 130 followed by sequence 131 comprising a two-dimensional convolutional layer (Conv), a batch normalization (BN) and a rectified linear activation function (ReLu) operation, followed by a concatenation (Concat) operation 132 and a final sequence 133 comprising a two-dimensional convolutional layer (Conv), a batch normalization (BN) and a rectified linear activation function (ReLu) operation.

Figure 2E:
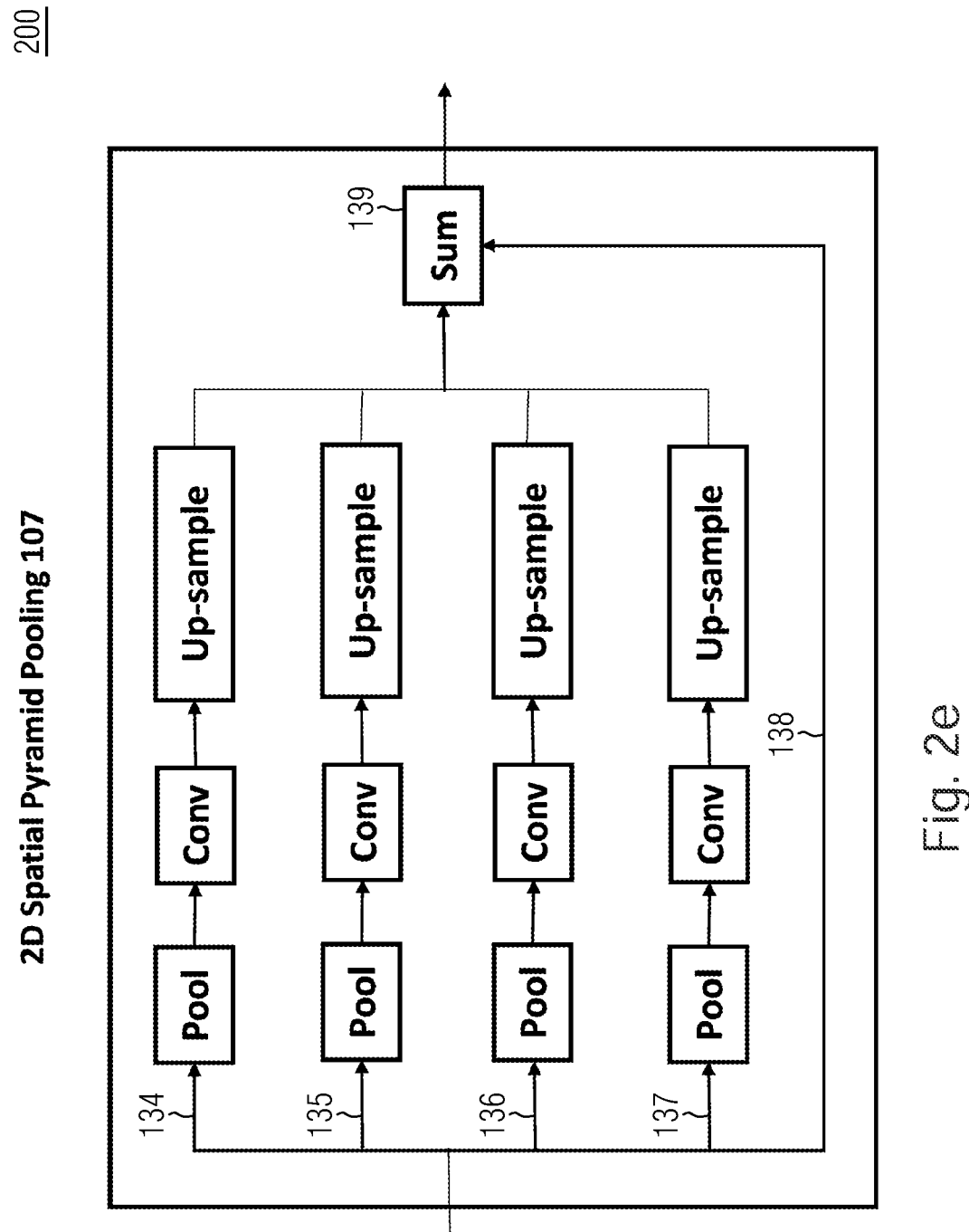
FIG. 2e: Exemplary two-dimensional spatial pyramid pooling block

FIG. 2e exemplary shows a possible exemplary configuration for the two-dimensional spatial pyramid pooling block 107 of FIG. 2a. The input to the exemplary two-dimensional spatial pyramid pooling block is directed to five branches 134, 135, 136, 137 and 138, wherein the four parallel branches 134, 135, 136, 137 each comprise a sequence of a pooling layer (Pool), a convolutional layer (Conv) and an up-sampling operation (Up-sample), the output of said four parallel branches 134, 135, 136, 137 is then merged with the fifth branch 138 which corresponds to the input of the two-dimensional spatial pyramid pooling block via a summation operation (Sum) 139 to generate the output of the two-dimensional spatial pyramid pooling block, i.e. branch 138 skips the operations of the four parallel branches 134, 135, 136, 137.

Figure 3A:
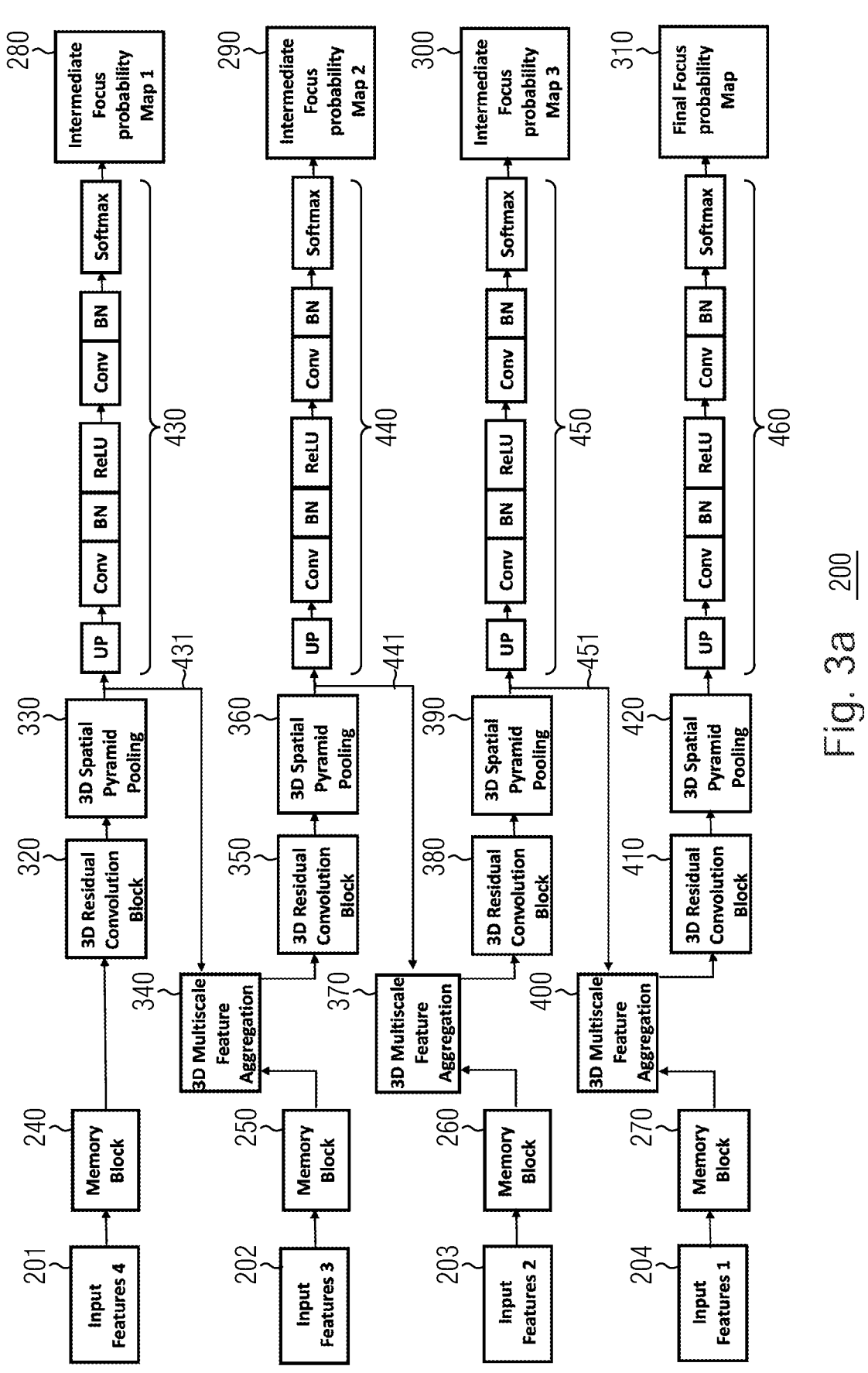
FIG. 3a: Exemplary three-dimensional decoder of convolutional neural network

FIG. 3a shows an exemplary part of an exemplary possible convolutional neural network architecture that can follow the output(s) 115, 116, 117, 118 of the exemplary encoder 100 shown in FIG. 2a, i.e. the extracted features/feature tensors 115, 116, 117, 118 become the input(s) for the exemplary three-dimensional decoder 200 shown in FIG. 3a.

For example, the three-dimensional output feature tensor/extracted feature tensor 115 of exemplary shape (C=16, H/8, W/8) may become the input 204, the feature tensor 116 of shape (C=16, H/16, W/16) may become the input 203, the feature tensor 117 of shape (C=16, H/32, W/32) may become the input 202 and the feature tensor 118 of shape (C=32, H/64, W/64) may become the input 201 for the decoder 200.

The exemplary decoder 200 outputs the final three-dimensional focus probability map 310 along with three other intermediate focus probability maps 280, 290, 300, all of them with shape (N, H, W) with N for example being the number of different focus positions in the focus schedule and with H and W corresponding to height and width dimension sizes of the input image 101 from FIG. 2a.

However, it may be conceivable that herein N also denoted additional focus positions that were not specified in the focus schedule but that have been synthesized by the convolutional neural network. Such synthesized/generated focus positions may be used to obtain further additional focus probability maps and therefore to increase the obtainable depth resolution.

Each of the input features/feature tensors 201, 202, 203, 204 passes first through a dedicated memory block 240, 250, 260, 270 where the stored features of the past images/previously captured images and previously processed images are retrieved and aligned with the features of the currently processed image, e.g. input image 101, resulting in a multi-dimensional tensor of shape (C,N,H,W) where C is the number of channel of the feature maps, N the number of different focus distances in the focus schedule, and H and W refer to the spatial resolution of the extracted features, i.e. the height and width dimension if the feature maps. Said multi-dimensional tensor represents for a given scale the image features extracted from the previously processed images aligned to the image features extracted for the currently processed image.

Figure 4A:
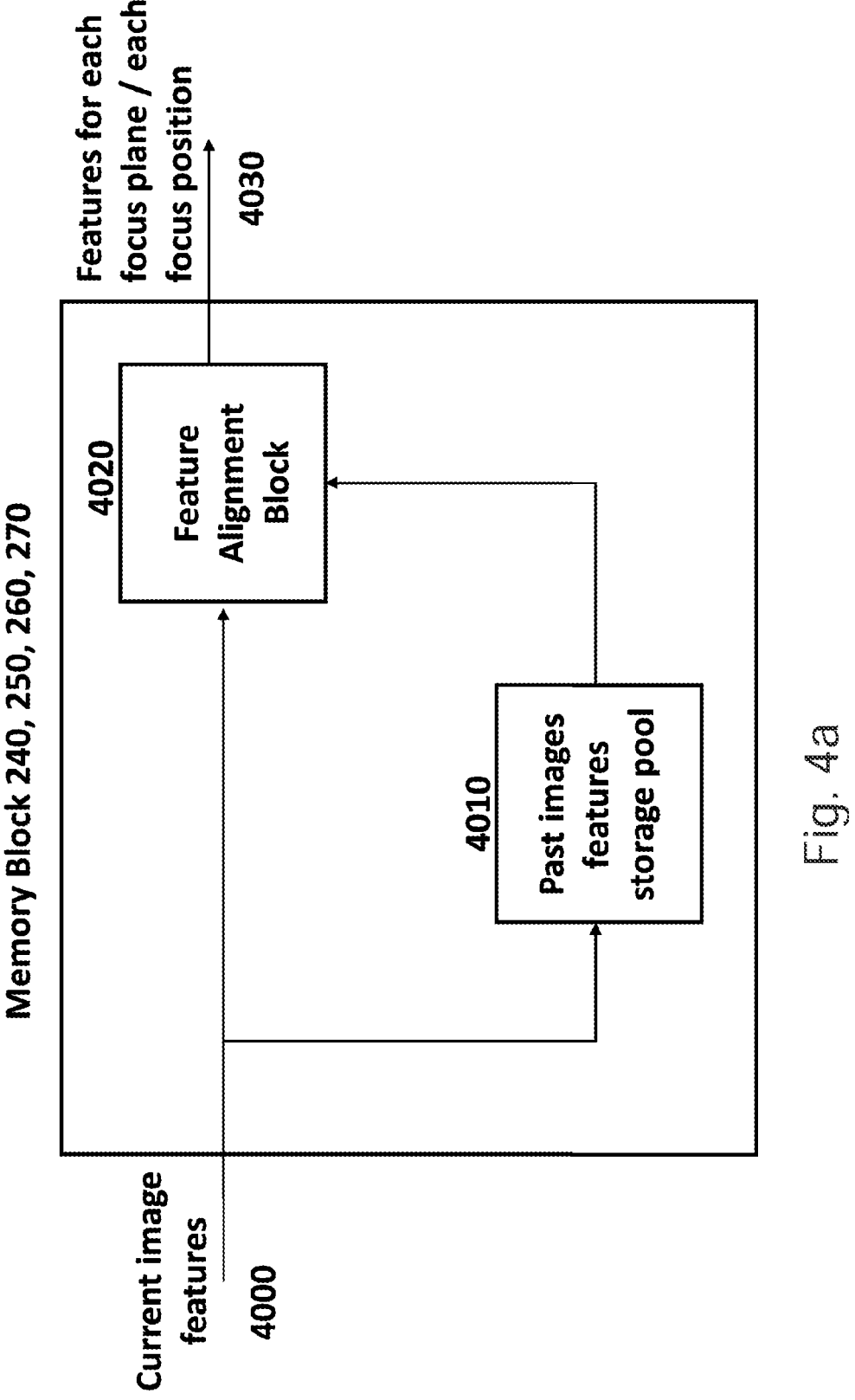
FIG. 4a: Exemplary memory block

An example for a memory block is shown in FIG. 4a.

In the following, three-dimensional (3D) operations or layers or blocks, e.g. a 3D residual convolution block or a 3D spatial pyramid pooling block or a 3D multiscale feature aggregation block, can be understood as acting/operating on the height and width dimensions of a feature tensor, e.g. the height and width dimensions of a feature map, as well as acting/operating on the focus position dimension. Said height and width dimensions may be equal in size or different in size from the size of the height and width dimensions of the input image 101.

After the passing of a memory block 240, 250, 260, 270, one or more three-dimensional (3D) residual convolutional blocks 320, 350, 380, 410 can be applied. In FIG. 3a only one three-dimensional (3D) residual convolutional block is shown for a given feature scale but it can be more than one, e.g. five.

Figures 3B, 3C:
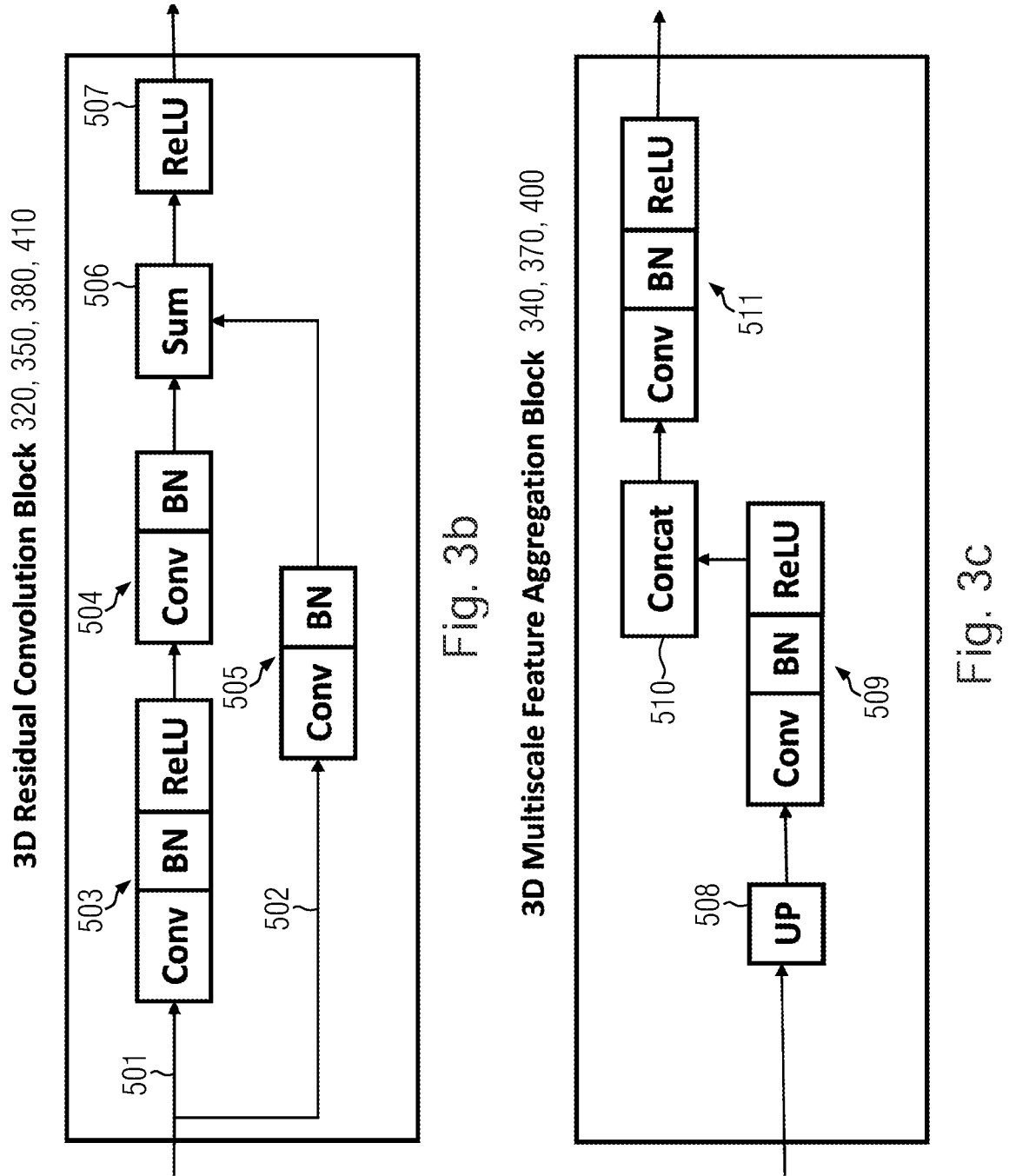
FIG. 3b: Exemplary three-dimensional residual convolution block
FIG. 3c: Exemplary three-dimensional multiscale feature aggregation block

An example for a three-dimensional (3D) residual convolutional block is shown in FIG. 3b.

The residual convolutional blocks 320, 350, 380, 410 are each followed by a three-dimensional (3D) spatial pyramid pooling block 330, 360, 390, 420.

Figure 3D:
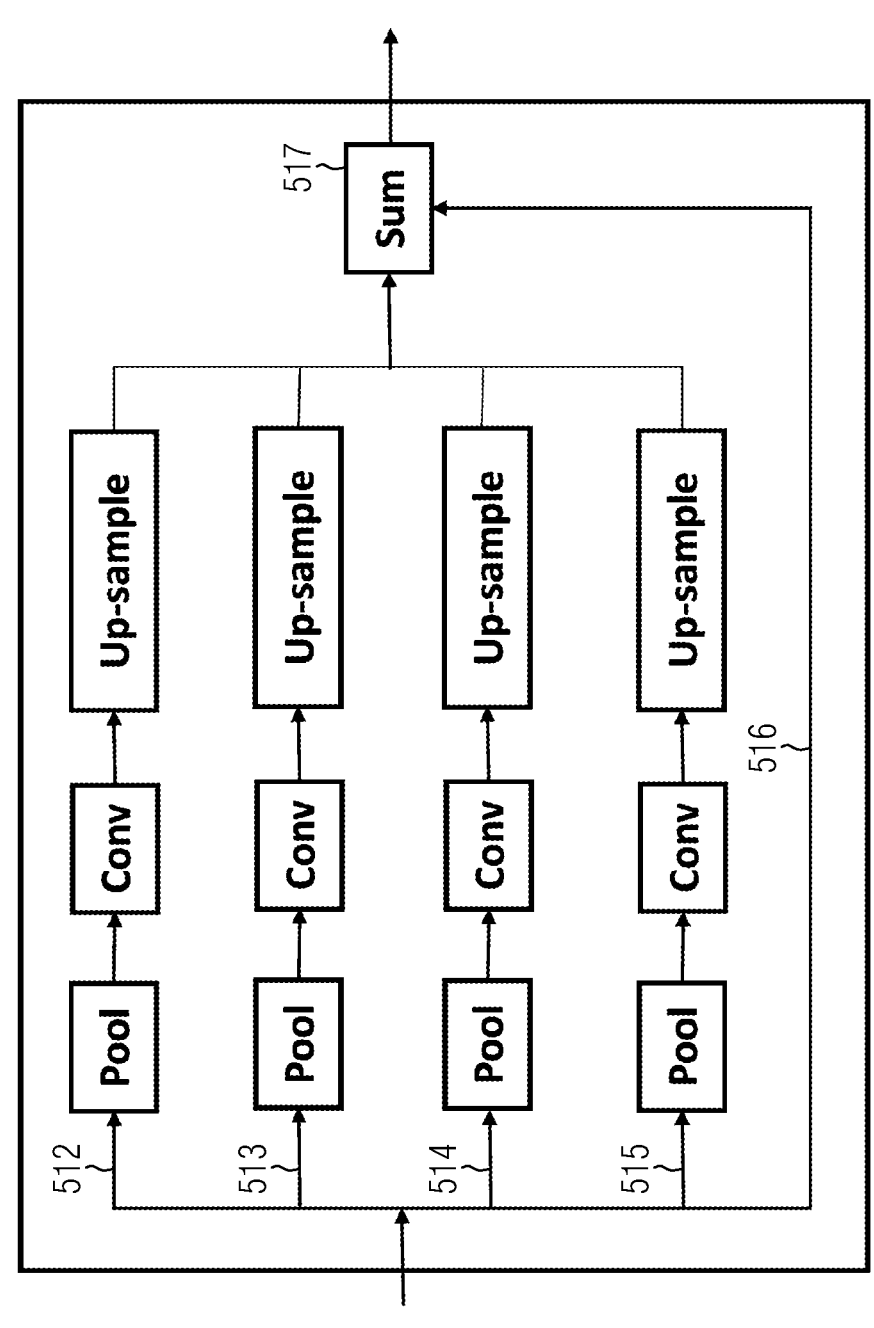
FIG. 3d: Exemplary three-dimensional spatial pyramid pooling block

An example for a three-dimensional (3D) spatial pyramid pooling block is shown in FIG. 3d.

The outputs of the pyramid pooling blocks 330, 360 390 exemplary follow two branches:

One branch 430, 440, 450 wherein an up-sampling (UP) occurs to the size/original spatial resolution of the input image 101, followed by a sequence of a convolutional layer (Conv), a batch normalization (BN) and a rectified linear activation function (ReLu), a further convolutional layer (Conv) and further batch normalization (BN) operation to reduce the number of channels to one and a final softmax operation to obtain an intermediate focus probability map 280, 290, 300.

The other branch 431, 441, 451 comprises a three-dimensional (3D) multiscale aggregation block 340, 370, 400, which merges the outputs of the three-dimensional spatial pyramid pooling blocks with the outputs of memory blocks 250, 260, 270. Specifically, in the shown exemplary architecture, the output of memory block 250 is merged with the output of three-dimensional spatial pyramid pooling block 330, the output of memory block 260 is merged with the output of three-dimensional spatial pyramid pooling block 360 and the output of memory block 270 is merged with the output of three-dimensional spatial pyramid pooling block 390.

An example for a three-dimensional (3D) multiscale aggregation block is shown in FIG. 3c.

After the features from all scales are aggregated and after passing the last three-dimensional residual convolutional block 410 and the last three-dimensional spatial pyramid pooling block 360, the final focus probability map 310 can be obtained by applying a last sequence 460 comprising a convolutional layer (Conv), a batch normalization (BN) and a rectified linear activation function (ReLu), a further convolutional layer (Conv) and further batch normalization (BN) operation and a final softmax operation.

Using the final focus probability map 310, fpm, outputted by the convolutional neural network the two-dimensional depth map $dmap_{i,j}$ can be obtained via $\Sigma_n fpm_{n,i,j}*f_n=dmap_{i,j}$, with i, j being natural number indices for the height and width dimensions and with $f_n$ being the unique focus positions that may comprise the unique focus positions of the focus schedule and any possible further unique focus positions that may have been synthesized/generated by the convolutional neural network and with n being a natural number index.

FIG. 3b shows an exemplary configuration for a/the three-dimensional residual convolution block(s) 320, 250, 380, 410 that can be used in the exemplary three-dimensional decoder 200 of FIG. 3a of an exemplary convolutional neural network architecture.

The three-dimensional residual convolution block can comprise two branches 501, 502.

Exemplary branch 501 comprises a first sequence 503 comprising a three-dimensional convolutional layer (Conv), a batch normalization (BN) and a rectified linear activation function (ReLu) operation and a second sequence 504 comprising a batch normalization (BN) and a rectified linear activation function (ReLu) operation.

Exemplary branch 502 only comprises a single sequence of a three-dimensional convolutional layer (Conv) and a batch normalization (BN) operation.

The output of said exemplary two branches is merged using a summation (Sum) operation 506 and the output of the three-dimensional residual convolution block is obtained after a final rectified linear activation function (ReLu) operation 507.

FIG. 3c shows a possible exemplary configuration for a/the three-dimensional multiscale feature aggregation block (s) 340, 370, 400 of FIG. 3a.

Said exemplary three-dimensional multiscale feature aggregation block can comprise an up-sampling operation (UP) 508 followed by sequence 509 comprising a three-dimensional convolutional layer (Conv), a batch normalization (BN) and a rectified linear activation function (ReLu) operation, followed by a concatenation (Concat) operation 510 and a final sequence 511 comprising a three-dimensional convolutional layer (Conv), a batch normalization (BN) and a rectified linear activation function (ReLu) operation.

It is conceivable that the previously mentioned possible synthetic focus positions can be generated inside a three-dimensional multiscale feature aggregation block. For example, synthetic focus positions may be generated using a three-dimensional up-sampling operation before the concatenation (Concat) operation 510.

FIG. 3d exemplary shows a possible exemplary configuration for a/the three-dimensional spatial pyramid pooling block(s) 330, 360, 390, 420 of FIG. 3a.

The input to the exemplary three-dimensional spatial pyramid pooling block is directed to five branches 512, 513, 514, 515 and 516, wherein the four parallel branches 512, 513, 514, 515 each comprise a sequence of a pooling layer (Pool), a convolutional layer (Conv) and an up-sampling operation (Up-sample), the output of said four parallel branches 512, 513, 514, 515 is then merged with the fifth branch 516 which corresponds to the input of the three-dimensional spatial pyramid pooling block via a summation operation (Sum) 517 to generate the output of the three-dimensional spatial pyramid pooling block, i.e. branch 516 skips the operations of the four parallel branches 512, 513, 514, 515.

FIG. 4a shows a possible exemplary configuration for a/the memory block(s) 240, 250, 260, 270 of the decoder of 200 FIG. 3a.

It can comprise a memory denoted as storage pool 4010, wherein image features/feature tensors that have been extracted from a predetermined number K of previously captured/previously processed images can be stored.

The past images features storage pool 4010 can for example store the features/feature tensors extracted from captured images by the 2D encoder shown in FIG. 2a of each of the last K images, with K, for example, being a natural number multiple of N, the number of focus positions.

The image features 4000 of a/the currently processed image for a given scale which are a three-dimensional tensor of shape (C,H,W), with channel dimension C, height dimension H and width dimension W can also be stored in the storage pool 4010.

The memory block can further comprise a feature alignment block 4020 that can take as input the features/feature tensors stored in the storage pool 4010, e.g. features/feature tensors extracted from said K previously captured/previously processed images, together with the features/feature tensors extracted from the currently processed image and output a four-dimensional tensor 4020 of shape (C,N,H,W) representing the images features of each focus position/each focus plane aligned to the last, chronologically ordered, focus position, i.e. the focus position of the currently processed image.

Herein, C again refers to the channel dimension, N to the focus position dimension, H to the height dimension and W to the width dimension of the currently processed image/image feature/image feature tensor/feature map.

Figure 4B:
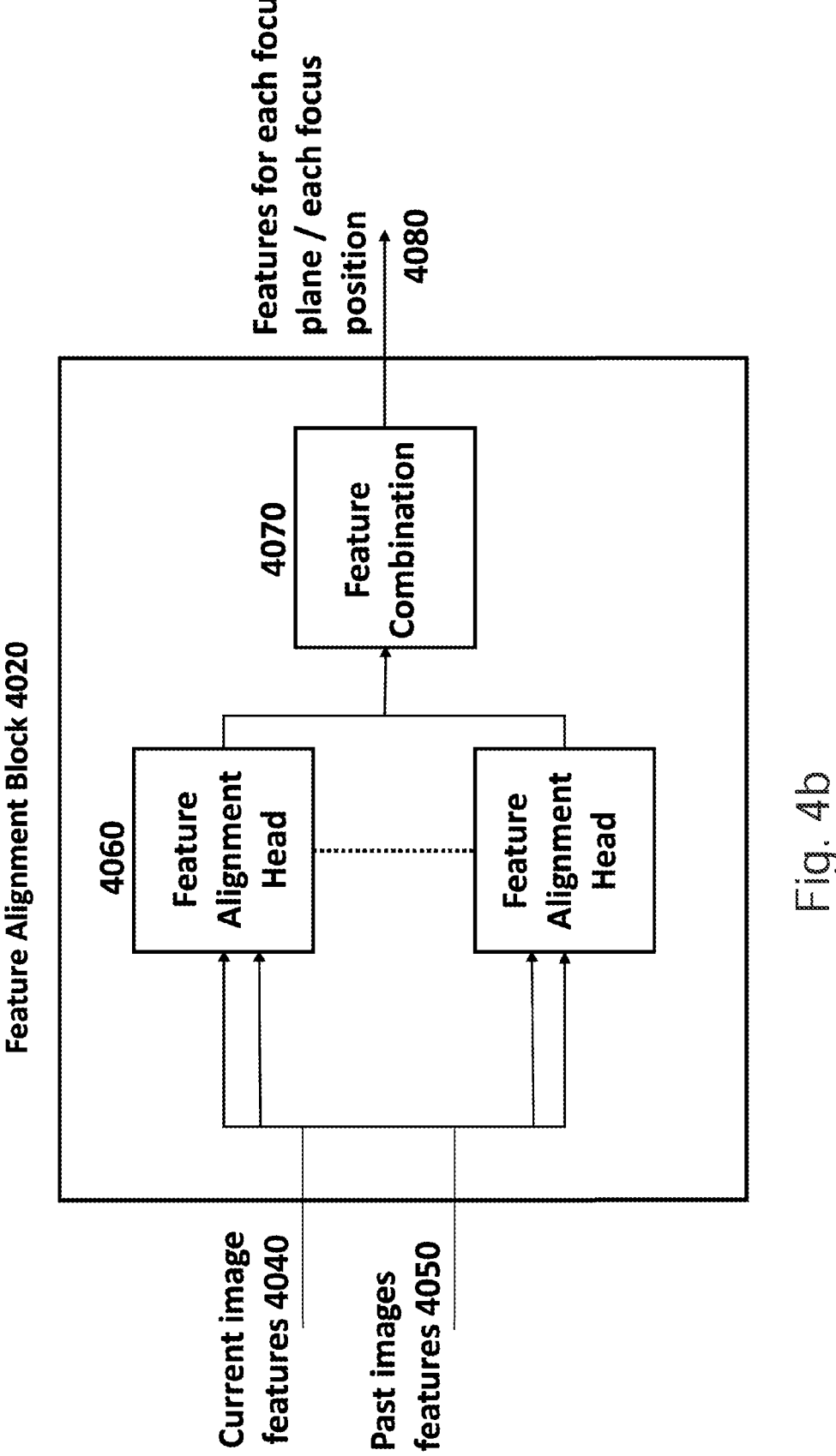
FIG. 4b: Exemplary feature alignment block

FIG. 4b shows an exemplary overview of the configuration of the aforementioned exemplary feature alignment block 4020.

The exemplary feature alignment block 4020 has two inputs, the three-dimensional image features/three-dimensional feature tensors 4040 from a/the currently processed image and a four-dimensional tensor 4050 representing the image features extracted from a predetermined number K of previously captured/previously processed images and that have been stored in a past images features storage pool, e.g. 4010 in past images features storage pool 4010.

The exemplary feature alignment block 4020 further comprises at least one feature alignment head 4060 and a feature combination operator 4070, e.g. a sum operator, to generate as output the multi-dimensional tensor representing the image features of all processed images aligned to the image features of the currently processed image, i.e. the four-dimensional tensor 4030, 4080 of shape (C,N,H,W) representing the images features of each focus position/each focus plane aligned to the last, chronologically ordered, focus position, i.e. the focus position of the currently processed image.

The feature alignment head(s) 4060 divide(s) the above-mentioned inputs into patches of different resolutions, i.e. patches with different sizes in height $h_p$ and width $w_p$ compared to the inputted features, ranging, for example, from patches of size 1×1 (meaning that the inputted features remain without change) to H×W (meaning that the whole inputted feature tensor will be treated as one patch).

Figure 4C:
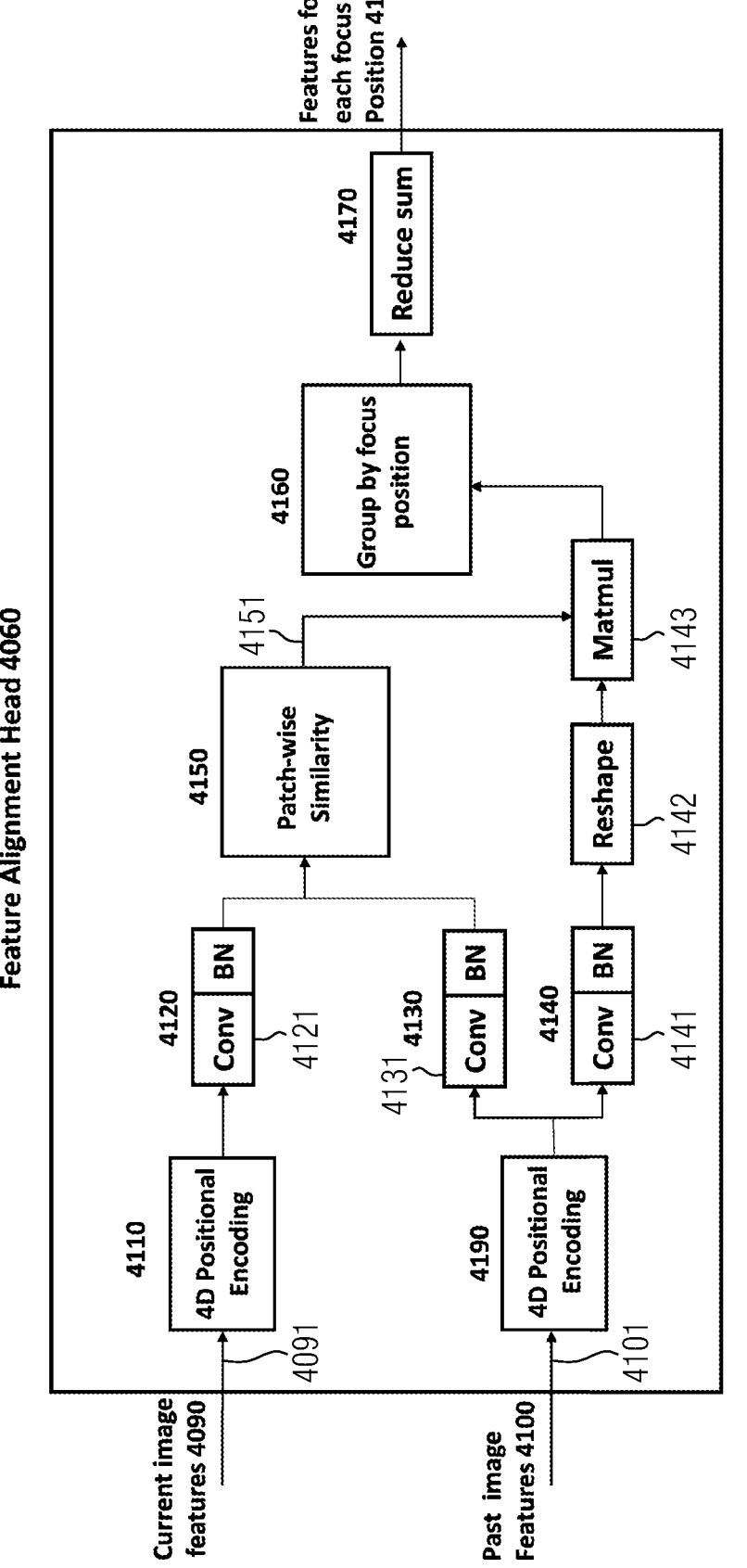
FIG. 4c: Exemplary feature alignment head

FIG. 4c shows an exemplary configuration of an exemplary feature alignment head, such as feature alignment head 4060 from feature alignment block 4020 that can be used in the exemplary decoder 200 of the convolutional neural network architecture shown in FIG. 3a.

The input of the current image features/feature tensors 4090, i.e. the input of image features extracted from the currently processed image is fed via branch 4091 to a (first) four-dimensional encoding block 4110 that embeds as previously indicated and as detailed again further below, temporal, spatial and focus position information into the image features 4090 extracted from the currently processed image.

The input of the past image features 4100, the image features extracted from the previously captured images, e.g. extracted from a predetermined number K of previously captured/previously processed images, is fed via branch 4101 to a separate (second) four-dimensional encoding block 4190 that embeds temporal, spatial and focus position information into the features extracted from the previously captured images.

For example, as previously indicated, a four-dimensional encoding E may be composed according to the following two equations:

$$E_{2i,x,y} = \sin\left(e^{2i(-\log(\alpha/c))}\sqrt{x^2 + y^2 + t^2 + d^2}\right) \tag{10}$$

$$E_{2i+1,x,y} = \cos\left(e^{2i(-\log(\alpha/c))}\sqrt{x^2 + y^2 + t^2 + d^2}\right) \tag{11}$$

with $\alpha$ being a correction constant, for instance $\alpha$ being greater than C, the number of channels or channel dimension size, x, y are spatial pixel coordinates, t is the time, i.e. the temporal position/the point in time/time stamp/time index of the captured image from which the image features were extracted, with t∈ [0, K−1], wherein K denotes a/the number of previously captured images, e.g. a/the predetermined number of captured images, d∈ [0, N−1] is the focus plane position/focus position/focus position index of a given image to be encoded and N is the total number of images or focus positions, e.g. the number of images in the focus schedule or the sum of the number of images in the focus schedule and the number of images derived from the images of the focus schedule, wherein said derived images may be derived by interpolation or extrapolation of images captured according to the focus schedule, and i∈ [0, C/2] is an index used for dividing the number of channels into even and odd channels for the encoding(s).

Said exemplary encoding E being composed of exemplary encodings $E_{2i,x,y}$, $E_{2i+1,x,y}$ can also take into account a given patch width $w_p$ and patch height $h_p$ resolution, i.e.

$$E \in \mathbb{R}^{C,\frac{H}{h_p},\frac{W}{w_p}}.$$

Said exemplary encodings can be applied by addition to the image features/feature tensors 4090 of the currently processed image $F \in \mathbb{R}^{C,H,W}$ and to each of the image features/feature tensors 4100 from the previously captured images, i.e. to each of the image features/feature tensors from the past K images $PF \in \mathbb{R}^{K,C,H,W}$ to obtain $EF \in \mathbb{R}^{C,H,W}$ and $EPF \in \mathbb{R}^{K,C,H,W}$ as follows.

The four-dimensional encoding block 4110 can obtain $EF \in \mathbb{R}^{C,H,W}$ via $$EF_{c,x,y} = F_{c,x,y} + E_{c,\frac{x}{w_p},\frac{y}{h_p}} \tag{12}$$

and the four-dimensional encoding block 4190 can obtain $EPF \in \mathbb{R}^{K,C,H,W}$ via $$EPF_{k,c,x,y} = PF_{k,c,x,y} + E^k_{c,\frac{x}{w_p},\frac{y}{h_p}} \tag{13}$$

with $$E^k \in \mathbb{R}^{C,\frac{H}{h_p},\frac{W}{w_p}}$$

denoting the encodings of the image features/feature tensors from the past/previously captured K images.

After the four-dimensional encoding of the current image features by four-dimensional encoding block 4110 a sequence 4121 of a two-dimensional convolutional layer (Conv) with batch normalization (BN) is applied to EF to obtain $EF^{query}$ along the output branch 4120 of the four-dimensional encoding block 4110.

Similarly, after the four-dimensional encoding of the past image features by four-dimensional encoding block 4190 a sequence 4131 of a two-dimensional convolutional layer (Conv) with batch normalization (BN) is applied to EPF to obtain $EPF^{key}$ along an output branch 4130 of the four-dimensional encoding block 4190.

Herein, the superscripts query and key merely serve as exemplary reference to concepts of retrieval systems, as will be explained further below.

The outputs from said output branches 4120 and 4130 are fed as inputs into a patch-wise similarity block 4150.

This block 4150, first, reshapes the three-dimensional tensor $EF^{query} \in \mathbb{R}^{C,H,W}$ into the two-dimensional matrix $$EF^{query'} \in \mathbb{R}^{\frac{HW}{w_p h_p}, w_p h_p C}$$

and the four-dimensional tensor $EPF^k \in \mathbb{R}^{K,C,H,W}$ into $$EPF^{key'} \in \mathbb{R}^{\frac{HW}{w_p h_p}, w_p h_p C}.$$

Then, the similarity between the reshaped $EF^{query'}$ and each of the K features tensors of $EPF^{key'}$ is computed. This similarity operation could be computed by the patch-wise similarity block 4150, for example, with $EF^{query'} = EF'$ and $EPF^{key'} = EPF'$ as follows:

$$Sim_{k,i,i'} = -\sqrt{\sum_j \left( EF'_{i,j} - EPF'_{k,i',j} \right)^2} \tag{14}$$

with $$Sim \in \mathbb{R}^{K,\frac{HW}{w_p h_p},\frac{HW}{w_p h_p}}$$

as the similarity scores between the image features of the currently processed image and the image features for each of the K past/previously captured images.

In particular, $Sim_{k,i,i'}$ can be understood as describing how similar a/the patch i of a/the feature tensor of the currently processed image is to a/the patch j of a/the feature tensor of the K past/previously captured images.

EF' and EPF' may have a shape of $[(H*W)/(w_p*h_p), w_p*h_p*C]$, with $w_p$ and $h_p$ as the patch width and height respectively. Assuming, for example, a patch size of [1,1], the shape would be [H*W, C]. Consequently, index i and index i' would have a range of [0, (H*W)−1] and index j a range of [0, C−1].

Then, the similarity scores are translated, by the patch-wise similarity block 4150, into probabilities:

$$Sim'_{k,i,j} = \frac{e^{Sim_{k,i,j}}}{\sum_{j'} e^{Sim_{k,i,j'}}} \tag{15}$$

where $$Sim' \in \mathbb{R}^{K,\frac{HW}{w_p h_p},\frac{HW}{w_p h_p}}$$

is the normalized similarity scores with the property:

$$\sum_j Sim'_{k,i,j} = 1 \ \forall k, i.$$

Said normalized similarity scores Sim' are/represent the output 4151 of the patch-wise similarity block 4150 after processing the inputs received from the branch 4120 following the first four-dimensional (4D) encoding block 4110 that processes the image features extracted from the currently processed image and received from the (first, upper) branch 4130 following the second four-dimensional (4D) encoding block 4190 that processes the image features extracted and stored from previously captured images, e.g. the image features extracted and stored from a/the predetermined number of captured images, e.g. from past K images.

For completeness it is to be noted that the herein described similarity scores are only exemplary and that also other similarity functions could be used to derive a similarity measure of the current processed image feature with previously processed and stored image features. Instead of the above-described exemplary Euclidean similarity other similarity functions, for example, a cosine similarity or a similarity operation using matrix multiplication or any other function that is able to compare two samples could be applied.

The other (second, lower) branch 4140 of the second four-dimensional (4D) encoding block 4190 comprises a first sequence 4141 comprising a two-dimensional convolutional layer (Conv) and batch normalization (BN) operation gives as output $EPF^v \in \mathbb{R}^{K,C,H,W}$ which is then reshaped, by a reshape operation/layer (Reshape) 4142, to $$EPF^{v'} \in \mathbb{R}^{K,\frac{HW}{w_p h_p},w_p h_p C}.$$

Said branch 4140 further comprises a matrix multiplication operation/layer 4143 (Matmul) wherein the normalized similarity scores Sim' from the patch-wise similarity block 4150 are multiplied with $EPF^{v'}$ to obtain $$AF' \in \mathbb{R}^{K, \frac{HW}{w_p h_p}, w_p h_p C}:$$

$$AF'_{k,i,i'} = \sum_{j} Sim'_{k,i,j} EPF^{v'}_{k,j,i'} \quad (16)$$

AF' is then further reshaped to AF$\in \mathbb{R}^{K,C,H,W}$, with H and W corresponding to the height and width dimension size of the input image 101, i.e. the currently processed image.

Herein the superscripts v, v' merely serve to distinguish EPF$^v$ and EPF$^{v'}$ from branch 4140 from EPF$^{key}$ from branch 4130 and from EF$^{query}$ from branch 4120.

This reshaping may be part of the matrix multiplication operation/layer 4143 (Matmul) or may be performed in a further separate reshape operation/layer (not shown).

Then, AF is grouped along the first dimension K, by block/operation/layer 4160, to group the features corresponding to the same focus position, thus obtaining GAF$\in \mathbb{R}^{N,M,C,H,W}$, with $$M = \frac{K}{N}.$$

Then after said grouping, all information from the extracted features is merged via the reduction sum operation/layer 4170 (Reduce sum):

$$EPF^a_{n,c,h,w} = \sum_{m} GAF_{n,m,c,h,w} \quad (17)$$

with EPF$\alpha \in \mathbb{R}^{N,C,H,W}$ being an example for the at least one multi-dimensional tensor representing the image features of all processed images, i.e. the image features of all processed focus positions, aligned to the image features of the currently processed image. As indicated earlier, it is also possible to generate a multi-dimensional tensor that represents not all image features of all processed images, but at least the image features of at least some of the processed images/previously captured/past images, aligned to the image features of the currently processed image.

The herein exemplary described memory blocks and feature alignment heads can be understood as forming a data structure model of a retrieval system in which image features can be stored in a key-value pair structure that can be queried in order to align previously processed and stored image features to the image features of a currently processed image.

For example the value of said key-value pair structure can be understood as being the content of/being represented by the four-dimensional tensor EPF$^{key} \in \mathbb{R}^{K,C,H,W}$ of the image features of the previously processed and stored images after applying the sequence 4141 comprising a two-dimensional convolutional layer (Conv) with batch normalization (BN) along the lower branch 4140, i.e. as content of/being represented by EPF$^v \in \mathbb{R}^{K,C,H,W}$ and the key can be understood as being the content of/being represented by the four-dimensional tensor EPF$^{key} \in \mathbb{R}^{K,C,H,W}$ of the image features of the previously processed and stored images after applying the sequence 4131 comprising a two-dimensional convolutional layer (Conv) with batch normalization (BN) along the upper branch 4140 following the 4D positional encoding block 4190.

The query can be understood as being the key of the three-dimensional tensor EF$^{query} \in \mathbb{R}^{C,H,W}$ i.e. the content of/being represented by EF$^{query}$ along the output branch 4120 of the four-dimensional encoding block 4110 that processed the image features from the currently processed image.

Stated differently, the four-dimensional tensor EPF$^{key} \in \mathbb{R}^{K,C,H,W}$ represents a set of keys in a retrieval system that are mapped against a query EF$^{query} \in \mathbb{R}^{C,H,W}$ to obtain a specific value or content or key from the set of keys that best matches the query.

For completeness it is noted that the weights of the convolutional layers applied in branches 4130 and 4140 may differ. Said weights may inter alia, for example, have been learned/optimized during training of the convolutional network.

FIG. 5 shows an exemplary flow chart for a method 800 for extracting depth information from a plurality of images taken by a camera at different focus positions, which can comprise one, some or all of the following steps.

Capturing, 801, a sequence of images of a scene with a camera at different focus positions according to a predetermined focus schedule that specifies a chronological sequence of focus positions of the camera, wherein said focus schedule may comprise any combination of a plurality of unique and/or non-unique, e.g. duplicate, focus positions.

Extracting, 802, by a machine learning algorithm comprising a convolutional neural network, image features of a predetermined number of captured images and storing said extracted image features, said convolutional neural network, for example, comprising a configuration as exemplary described in FIGS. 2a, 2b, 2c, 2d, 2e, 3a, 3b, 3c, 3d, 4a, 4b,4c, and said storing may comprise storing said features, for example, inside a memory block 240, 250, 260, 270, e.g. in feature storage pool 4010.

After having extracted and stored image features from said predetermined number of captured images, processing, by the machine learning algorithm, a captured image whose image features have not yet been extracted, said captured image representing a currently processed image, e.g. input image 101.

Said processing comprising extracting by the machine learning algorithm image features from the currently processed image and storing the extracted image features.

Said processing further comprising aligning the image features stored from the previously captured images with the image features of the currently processed image, wherein, for example, said alignment is carried out by a feature alignment head of a memory block as exemplary described in FIGS. 3a, 4a,4b,4c.

Said processing further comprising generating at least one multi-dimensional tensor representing the image features of all processed images aligned to the image features of the currently processed image, as for example the tensor EPF$\alpha \in \mathbb{R}^{N,C,H,W}$ as described above.

Generating a two-dimensional depth map using the focus positions specified in the predetermined focus schedule and the at least one generated multi-dimensional tensor.

Figure 6:
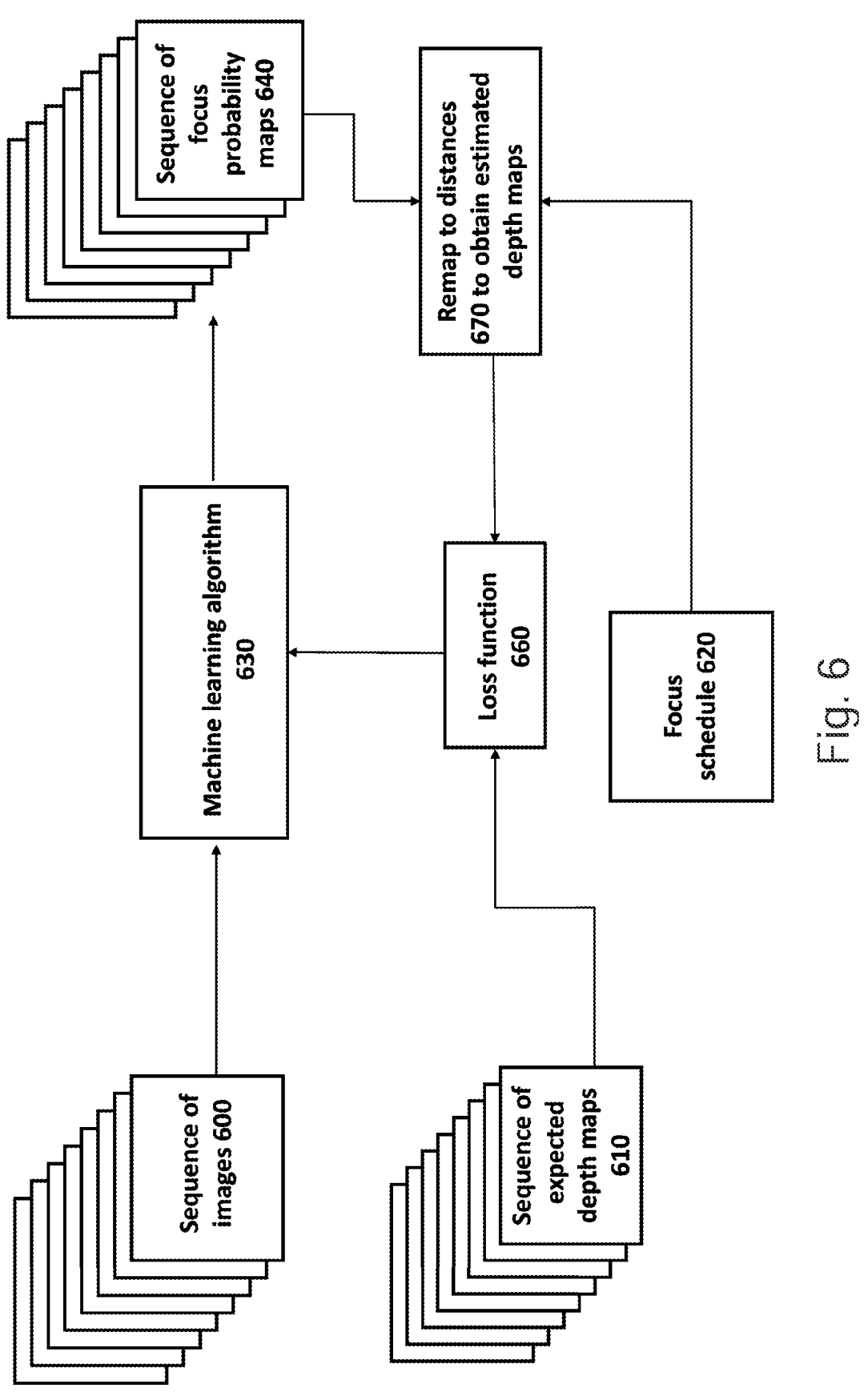
FIG. 6: Exemplary schematic overview of training of machine learning algorithm.

FIG. 6 shows a schematic example of a possible training protocol for machine learning algorithm 630 comprising a convolutional neural network with an architecture as exemplary described above.

Herein a training sample comprising a plurality/a sequence 600 of captured images focused at different focus positions according to a focus schedule 620 for a plurality of different scenes from the real physical world can be processed according to the steps described previously to obtain a sequence 640 of focus probability maps, one for each image after a predetermined number of captured images have been processed.

The captured images may have been taken with same camera or with different cameras. In other words, the herein described method is independent from the type of camera, i.e. is not restricted to the use of a specific type of camera.

The scenes captured in the sequence 600 of images of the training sample can be static or dynamic, i.e. there can be movement between images, e.g. due to movement of objects or subjects in the scene and/or due to movement of the camera, e.g. vibrations due to the camera being held in the hand of a user or due to the camera changing its position.

The obtained focus probability maps are remapped 670 to real distances using the focus positions from the known focus schedule 620.

The result is a sequence of predicted/estimated depth maps which are then, along with the sequence of ground truth depth maps 610, i.e. known/expected depth maps, used as inputs to the loss function 660.

The loss function 660 is a measure of how different the estimated/predicted depth maps are with respect to the expected known ground truth depth maps.

The training of the machine learning algorithm 630 comprising a convolutional neural network is run until the loss function has reached a desired/specified minimum and the optimal model parameters of the convolutional neural network have been determined.

The minimization of the loss function may be achieved by optimization techniques such as using a gradient descent algorithm.

However, also other optimization techniques, e.g. simulated annealing, genetic algorithms or Markov-chain-Monte-Carlo algorithms, may be applied to minimize the loss function and to determine the best model parameters of the machine learning algorithm/convolutional neural network from the training.

To further optimize the training, visual cues can be used to better derive a semantically correct depth map. For example, the convolutional neural network can be trained to recognize that when an object occults another object, the occulting object is closer to the camera than the occulted object.

REFERENCE SIGN LIST

Followed by FIGS. 1, 2a, 2b, 2c, 2d, 2e,3a, 3b, 3c, 3d, 4a, 4b, 4c, 5 and 6, wherein the reference signs denote the following exemplary components and exemplary steps.

700 image stream, plurality of images
710 focus schedule
720 machine learning algorithm comprising a convolutional neural network
730 focus probability map
740 remapping to real physical distances
750 estimated/extracted depth map
100 two-dimensional encoder of convolutional neural network
101 input image/currently processed image
102 two-dimensional convolution/convolutional block/layer
103, 104, 105, 106 two-dimensional residual convolution/convolutional block/layer
107 two-dimensional spatial pyramid pooling block/layer
108, 109, 110 two-dimensional multiscale feature aggregation block/layer

111, 112, 113, 114 sequence of blocks/layers of convolutional neural network
111a, 112a, 113a, 114a convolution/convolutional layer/block/operation
111b, 112b, 113b, 114b batch normalization layer/block/operation
111c, 112c, 113c, 114c rectified linear activation function layer/block/operation
115, 116, 117, 118 outputted/extracted features/feature tensors
119, 120, 121 sequence of blocks/layers of 2D convolution/convolutional block/layer
122 pooling block/layer of 2D convolution/convolutional block/layer
123 sequence of two-dimensional convolutional layer, a batch normalization and a rectified linear activation function operation
124, 127 sequence of two-dimensional convolutional layer and a batch normalization
125 summation layer/block/operation
126 rectified linear activation function operation
128, 129 branch of 2D residual convolution/convolutional block/layer
130 up-sampling layer/block/operation
131, 133 sequence of two-dimensional convolutional layer, a batch normalization and a rectified linear activation function operation
132 concatenation layer/block/operation
134, 135, 136, 137, 138 branches of 2D spatial pyramid pooling block/layer
139 summation layer/block/operation
200 decoder/decodification layer
201, 202, 203, 204 input features/feature tensors
240, 250, 260, 270 memory block
340, 370, 400 three-dimensional multiscale feature aggregation block/layer
320, 350, 380, 410 3D residual convolution/convolutional block/layer
330, 360, 390, 420 3D spatial pyramid pooling block/layer
430, 431, 440, 441, 450, 451, 461 output branches of 3D spatial pyramid pooling block/layer
280, 290, 300 intermediate focus probability map
310 final focus probability map
501, 502 branch of 3D residual convolution/convolutional block/layer
503 sequence of two-dimensional convolutional layer, a batch normalization and a rectified linear activation function operation
504, 505 sequence of two-dimensional convolutional layer and a batch normalization
506 summation layer/block/operation
507 rectified linear activation function operation
508 up-sampling layer/block/operation
509, 511 sequence of two-dimensional convolutional layer, a batch normalization and a rectified linear activation function operation
510 concatenation layer/block/operation
512, 513, 514, 515, 516 branches of 3D spatial pyramid pooling block/layer
518 summation layer/block/operation
4000 image features of a/the currently processed image
4010 computer-readable memory to store image features/features from previously processed images/feature storage pool
4020 feature alignment block

25

4030 images features of each focus position/of each focus plane aligned to the last, chronologically ordered, focus position, i.e. the current focus position

4040 image features of a/the currently processed image

4050 image features of previously processed images

4060 feature alignment head

4070 feature combination operator/block/layer

4080 images features of each focus position/of each focus plane aligned to the last, chronologically ordered, focus position, i.e. the current focus position

4090 image features of a/the currently processed image

4100 image features of previously processed images

4110, 4190 4D positional encoding block/layer/operation

4121, 4131, 4141 sequence of a two-dimensional convolutional layer with batch normalization

4120 branch of 4D positional encoding block 4110

4130, 4140 branches of 4D positional encoding block 4190

4142 Reshape layer/block/operation

4143 Matrix multiplication layer/block/operation

4150 patch-wise similarity block/layer/operation

4160 block/layer/operation for grouping focus positions

4170 reduction sum operation/layer

4180 images features of each focus position/of each focus plane aligned to the last, chronologically ordered, focus position, i.e. the current focus position

800 method for extracting depth information from a plurality of images taken by a camera at different focus positions

801, 802, 803, 804, 805, 806, 807 method steps

600 sequence of images of training sample

610 sequence of known/expected/ground truth depth maps

620 focus schedule

630 machine learning algorithm comprising a convolutional neural network

640 sequence of obtained focus probability maps

660 loss function

670 remapping operation to real physical distances to obtain estimated/predicted depth maps

The invention claimed is:

1. A computer-implemented method for extracting depth information from a plurality of images taken by a camera at different focus positions, the method comprising:

capturing a sequence of images of a scene with the camera at different focus positions according to a predetermined focus schedule that specifies a chronological sequence of focus positions of the camera, extracting, by a machine learning algorithm comprising a convolutional neural network, image features of a predetermined number of captured images, wherein said extracted image features are stored individually for each of the predetermined number of captured images, after having extracted and stored image features from said predetermined number of captured images, processing, by the machine learning algorithm, a captured image whose image features have not yet been extracted, said captured image representing a currently processed image, said processing comprising extracting by the machine learning algorithm image features from the currently processed image and storing the extracted image features from the currently processed image, wherein, while performing the processing of the currently processed image, information of at least some or all of the other captured images is saved, re-used, and taken into account,

said processing further comprising aligning image features stored from previously captured images with the image features of the currently processed image, and generating at least one multi-dimensional tensor representing the image features of at least some of the previously captured and processed images aligned to the image features of the currently processed image, generating a two-dimensional depth map using the focus positions specified in the predetermined focus schedule and the at least one generated multi-dimensional tensor.

2. The method according to claim 1, wherein the image features of the predetermined number of captured images and the image features of the currently processed image are extracted as three-dimensional feature tensors comprising a width dimension, W, a height dimension, H, and a channel dimension, C, wherein said channel dimension describes the number of feature maps extracted from an image by one or more layers of the convolutional neural network and wherein the storing of extracted image features comprises storing the extracted image features as a list of three-dimensional feature tensors.

3. The method according to claim 2, wherein extracting image features of the predetermined number of captured images and extracting image features of the currently processed image further comprises extracting, by the machine learning algorithm, image features at different scales, wherein said scales are defined as a fraction of the height of an input image and/or as fraction of the width of an input image, wherein said input image is either an image of the predetermined number of captured images or the currently processed image.

4. The method according to claim 1, wherein the aligning of the image features stored from the previously captured images with the image features of the currently processed image comprises applying a four-dimensional encoding to the image features stored from the previously captured images and to the image features from the currently processed image, said four-dimensional encoding comprising embedding temporal, spatial and focus position information into the image features from the previously captured images and into the image features from the currently processed image.

5. The method according to claim 4, wherein the four-dimensional encoding is non-linear and/or wherein the four-dimensional encoding is applied via addition to the image features from the currently processed image and to each of the image features stored from the previously captured images.

6. The method according to claim 4, wherein the four-dimensional encoding is based on using trigonometric functions.

7. The method according to claim 1, wherein the step of generating the two-dimensional depth map using the focus positions specified in the predetermined focus schedule and the at least one generated multi-dimensional tensor comprises, generating, by the machine learning algorithm, at least one multi-dimensional focus probability map and remapping said at least one multi-dimensional focus probability map to real physical distances using the focus positions specified in the predetermined focus schedule.

8. The method according to claim 7, wherein the at least one multi-dimensional focus probability map is a three-dimensional tensor having a width dimension, W, a height dimension, H, and a focus position dimension, N, said focus position dimension describing the number of focus positions, and wherein the size of the width and height dimensions are equal to the size of the width and height dimensions of an input image from the captured sequence acquired according to the predetermined focus schedule, wherein said input image is either an image of the predetermined number of captured images or the currently processed image.

9. The method according to claim 7, wherein the remapping of the at least one multi-dimensional focus probability map to real physical distances using the focus positions specified in the predetermined focus schedule comprises computing the dot product between each pixel of the at least one multi-dimensional focus probability map and the focus positions in the focus schedule.

10. The method according to claim 1, wherein the at least one generated multi-dimensional tensor representing the image features of the previously captured images and the currently processed image aligned to the image features of the currently processed image is a four-dimensional tensor comprising a width dimension, W, a height dimension, H, a channel dimension, C, wherein said channel dimension describes the number of feature maps extracted from the previously captured images and the currently processed image by one or more layers of the convolutional neural network, and a focus position dimension, N, said focus position dimension describing the number of focus positions.

11. The method according to claim 1, wherein the image features extracted from the predetermined number of captured images and the image features extracted from the currently processed image are stored in a computer-readable memory in a circular buffer that can hold at least the image features from the predetermined number of captured images, and/or wherein the predetermined number of captured images is at least equal to or greater than the number of different focus positions specified by the focus schedule.

12. The method according to claim 1, wherein the convolutional neural network is a trained convolutional neural network that has been trained on a training sample comprising a plurality of images focused at different focus positions for a plurality of different scenes, wherein the scenes are static or dynamic, and wherein the convolutional neural network parameters are optimized by comparing estimated depth maps generated by the convolutional neural network with corresponding known ground truth depth maps using a loss function.

13. A computing system comprising:
a computer memory,
one or more processors, the computer memory storing instructions that direct the one or more processors to carry out a method according to claim 1.

14. The computing system according to claim 13, wherein the computing system is a portable mobile device comprising the camera that is configured for capturing images of a scene with different focus positions.

15. A non-transitory computer-readable storage medium for storing computer-executable instructions that, when executed by a computer system, perform a method according to claim 1.

16. The method according to claim 1, wherein the steps of extracting and processing are carried out iteratively or in a loop until all captured images or until a desired number of captured images have been processed.

* * * * *